(12) United States Patent
Kim et al.

(10) Patent No.: US 12,238,540 B2
(45) Date of Patent: *Feb. 25, 2025

(54) METHOD AND APPARATUS FOR TRANSMITTING/RECEIVING DATA USING PLURALITY OF CARRIERS IN MOBILE COMMUNICATION SYSTEM

(71) Applicant: Samsung Electronics Co., Ltd., Suwon-si (KR)

(72) Inventors: Soenghun Kim, Suwon-si (KR); Gert Jan Van Lieshout, Apeldoorn (NL); Sangbum Kim, Suwon-si (KR); Kyeongin Jeong, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 62 days.

This patent is subject to a terminal disclaimer.

(21) Appl. No.: 17/334,585

(22) Filed: May 28, 2021

(65) Prior Publication Data

US 2021/0289368 A1 Sep. 16, 2021

Related U.S. Application Data

(63) Continuation of application No. 16/206,897, filed on Nov. 30, 2018, now Pat. No. 11,026,102, which is a (Continued)

(30) Foreign Application Priority Data

Oct. 29, 2013 (KR) .......................... 10-2013-0129230
Nov. 1, 2013 (KR) .......................... 10-2013-0132103
Apr. 1, 2014 (KR) .......................... 10-2014-0038857

(51) Int. Cl.
*H04W 76/00* (2018.01)
*H04W 24/02* (2009.01)
(Continued)

(52) U.S. Cl.
CPC .......... *H04W 24/02* (2013.01); *H04W 28/02* (2013.01); *H04W 72/20* (2023.01); *H04W 76/10* (2018.02); *H04W 76/15* (2018.02)

(58) Field of Classification Search
None
See application file for complete search history.

(56) References Cited

U.S. PATENT DOCUMENTS 8,743,724 B2 6/2014 Kwon et al.
9,219,584 B2 12/2015 Chang et al.
(Continued)

FOREIGN PATENT DOCUMENTS

CN 101048982 A 10/2007
CN 102257869 A 11/2011
(Continued)

OTHER PUBLICATIONS

European Patent Office, "Supplementary European Search Report," Application No. EP 14857431, May 10, 2017, 6 pages.
(Continued)

*Primary Examiner* — Lakeram Jangbahadur

(57) ABSTRACT

A mobile communication system is provided. In particular, a method and an apparatus for transmitting/receiving data using a plurality of carriers in a mobile communication system is provided.

3 Claims, 19 Drawing Sheets

Related U.S. Application Data continuation of application No. 15/033,579, filed as application No. PCT/KR2014/010243 on Oct. 29, 2014, now Pat. No. 10,149,175.

(51) Int. Cl.
| | |
|---|---|
| *H04W 28/02* | (2009.01) |
| *H04W 72/20* | (2023.01) |
| *H04W 76/10* | (2018.01) |
| *H04W 76/15* | (2018.01) |

(56) References Cited

U.S. PATENT DOCUMENTS

| | | | |
|---|---|---|---|
| 2007/0121542 A1 | 5/2007 | Lohr et al. | |
| 2010/0098011 A1 | 4/2010 | Pelletier et al. | |
| 2011/0268048 A1 | 11/2011 | Toskala et al. | |
| 2012/0002635 A1 | 1/2012 | Chung et al. | |
| 2012/0140743 A1 | 6/2012 | Pelletier et al. | |
| 2013/0010620 A1* | 1/2013 | Dinan | H04W 76/15 370/252 |
| 2013/0083783 A1 | 4/2013 | Gupta et al. | |
| 2015/0110048 A1* | 4/2015 | Damnjanovic | H04W 72/51 370/329 |
| 2016/0050652 A1* | 2/2016 | Wu | H04W 28/24 370/329 |
| 2016/0286412 A1 | 9/2016 | Kim et al. | |
| 2017/0006587 A1 | 1/2017 | Kim | |
| 2017/0180091 A1 | 6/2017 | Futaki | |
| 2020/0260445 A1 | 8/2020 | Jeong et al. | |

FOREIGN PATENT DOCUMENTS

| | | |
|---|---|---|
| CN | 102348269 A | 2/2012 |
| CN | 102655682 A | 9/2012 |
| CN | 103238368 A | 8/2013 |
| CN | 105684501 A | 6/2016 |
| IN | 101867871 A | 10/2010 |
| KR | 10-2011-0122054 A | 11/2011 |
| WO | 2010/137917 A2 | 12/2010 |
| WO | 2012/169816 A2 | 12/2012 |
| WO | 2013/104416 A1 | 7/2013 |
| WO | 2013112021 A1 | 8/2013 |
| WO | 2013112952 A1 | 8/2013 |

OTHER PUBLICATIONS

International Search Report dated Jan. 26, 2014 in connection with International Patent Application No. PCT/KR2014/010243, 5 pages.
Written Opinion of International Searching Authority dated Jan. 26, 2014 in connection with International Patent Application No. PCT/KR2014/010243, 5 pages.
Huawei et al., "Impact Analysis of Bearer Split Options for Multi-Site Aggregation", R2-13784, 3GPP TSG-RAN WG2 Meeting #82, May 20-24, 2013, 4 pages.
Office Action dated Dec. 21, 2018 in connection with Chinese Patent Application No. 201480059854.5, 27 pages.
"Evolved Universal Terrestrial Radio Access (E-UTRA); Study on Small Cell Enhancements for E-UTRA and E-UTRAN", 3GPP TR 36 842 V0.4.0 (Oct. 2013).
Decision of Patent dated Nov. 5, 2020 in connection with Korean Application No. 10-2020-0117733, 4 pages.
China National Intellectual Property Administration (CNIPA), "Notification of Granting of Patent Right to Invention," Issued Oct. 8, 2022, in connection with Chinese Patent Application No. 202010361233.X, 9 pages.
NEC et al., "List of test cases/scenarios proposal for 3G Long Term Evolution Terminal Protocol Conformance Test Specifications WI," 3GPP TSG-RAN WG5 meeting#39, R5-081283, Kansas City, US, May 5-9, 2008, 64 pages.
European Patent Office, "Communication pursuant to Article 94(3) EPC," dated Feb. 16, 2023, in connection with European Patent Application No. 21176384.2, 8 pages.

* cited by examiner

METHOD AND APPARATUS FOR TRANSMITTING/RECEIVING DATA USING PLURALITY OF CARRIERS IN MOBILE COMMUNICATION SYSTEM

CROSS-REFERENCE TO RELATED APPLICATIONS

The present application is a continuation of U.S. patent application Ser. No. 16/206,897 filed on Nov. 30, 2018, which is a continuation of U.S. patent application Ser. No. 15/033,579 filed on Apr. 29, 2016, which is a 371 of International Patent Application No. PCT/KR2014/010243 filed on Oct. 29, 2014, which claims priority to Korean Patent Application No. 10-2014-0038857 filed on Apr. 1, 2014, Korean Patent Application No. 10-2013-0132103 filed on Nov. 1, 2013, and Korean Patent Application No. 10-2013-0129230 filed on Oct. 29, 2013, the disclosures of which are herein incorporated by reference in their entirety.

BACKGROUND

1. Field

The present invention relates generally to a mobile communication system, and more particularly, to a method and an apparatus for transmitting/receiving data using a plurality of carriers in a mobile communication system.

2. Description of Related Art

In general, a mobile communication system has been developed for the purpose of providing communications while securing user's mobility. With the rapid progress of technology, such a mobile communication system can now provide not only voice communications but also high-speed data communication services.

Recently, as one of the next-generation of mobile communication systems, standardization of a Long Term Evolution (LTE) system in the 3$d$ Generation Partnership Project (3GPP) is currently underway. The LTE system is a technology to implement high-speed packet-based communication having a transmission speed of about 100 Mbps at maximum, which is higher than the data transmission speed that is currently provided, and the standardization thereof has already been completed at present.

Current, discussion of a Long Term Evolution-Advanced (LTE-A) system has been regularized, which improves the transmission speed through grafting of various new technologies on the LTE communication system. A representative one of the newly introduced technologies may be carrier aggregation. The carrier aggregation corresponds to a case where one terminal uses a plurality of forward carriers and a plurality of reverse carriers, unlike a case where a terminal performs data transmission/reception using one forward carrier and one reverse carrier as in the related art.

Currently, in the LTE-A, only intra-ENB carrier aggregation has been defined. This may result in the reduction of applicability of the carrier aggregation function, and particularly, in a scenario in which a plurality of pico cells and one macro cell operate to overlap each other, this may cause problems in that the macro cell and the pico cells are unable to be aggregated.

SUMMARY

The present invention has been made in order to solve the above problems, and an aspect of the present invention provides a method and an apparatus for inter-Evolved Node B (ENB) carrier aggregation.

In one aspect of the present invention, a method for transmitting/receiving data of User Equipment (UE) includes: receiving a first control message from a first Evolved Node B (ENB) that controls a first cell group; adding a second cell group that is controlled by a second ENB based on the first control message; determining a bearer type of the first and second cell groups based on the first control message; and in the case where the determined bearer type is a first bearer type, receiving data through the first and second cell groups, and transmitting data through any one of the first and second cell groups.

In another aspect of the present invention, a method for transmitting/receiving data of an Evolved Node B (ENB) that controls a first cell group, includes: determining whether to add another ENB and a second cell group; transmitting, to User Equipment (UE), a first control message which includes a command for adding the second cell group that is controlled by the another ENB and bearer type information of the first and second cell groups; in the case where the bearer type of the first and second cell groups is a first bearer type, transmitting data to the UE through the first cell group; and if the first cell group is selected on the basis of uplink mode information in the case where the bearer type of the first and second cell groups is the first bearer type, receiving data from the UE through the first cell group.

In still another aspect of the present invention, a method for transmitting/receiving data of an Evolved Node B (ENB) that controls a second cell group, includes: determining whether to add another ENB that controls a first cell group configured by User Equipment (UE) and the second cell group; in the case where a bearer type of the first and second cell groups is a first bearer type based on a first control message configured by the another ENB, transmitting data to the UE through the second cell group; and if uplink mode information that is included in the first control message indicates the second cell group in the case where the bearer type of the first and second cell groups is the first bearer type based on the first control message configured by the another ENB, receiving data from the UE through the second cell group.

In still another aspect of the present invention, User Equipment (UE) includes: a transceiver unit transmitting/receiving signals with first and second Evolved Node Bs (ENBs); and a control unit operating to receive a first control message from the first ENB that controls a first cell group, to add a second cell group that is controlled by the second ENB based on the first control message, to determine a bearer type of the first and second cell groups based on the first control message, to receive, in the case where the determined bearer type is a first bearer type, data through the first and second cell groups, and to transmit data through any one of the first and second cell groups.

In still another aspect of the present invention, an Evolved Node B (ENB) that controls a first cell group, includes: a transceiver unit transmitting/receiving signals with User Equipment (UE) and another ENB; and a control unit operating to determine whether to add the another ENB and a second cell group, to transmit, to the UE, a first control message which includes a command for adding the second cell group that is controlled by the another ENB and bearer type information of the first and second cell groups; to transmit, in the case where the bearer type of the first and second cell groups is a first bearer type, data to the UE through the first cell group, and to receive, if the first cell group is selected on the basis of uplink mode information in the case where the bearer type of the first and second cell groups is the first bearer type, data from the UE through the first cell group.

In still another aspect of the present invention, an Evolved Node B (ENB) that controls a second cell group, includes: a transceiver unit transmitting/receiving signals with User Equipment (UE) and another ENB; and a control unit operating to determine whether to add the another ENB that controls a first cell group configured by the UE and the second cell group, to transmit, in the case where a bearer type of the first and second cell groups is a first bearer type based on a first control message configured by the another ENB, data to the UE through the second cell group, and to receive, if uplink mode information that is included in the first control message indicates the second cell group in the case where the bearer type of the first and second cell groups is the first bearer type based on the first control message configured by the another ENB, data from the UE through the second cell group.

In accordance with various embodiments of the present invention, the transmission/reception speed of the UE can be improved through the inter-ENB carrier aggregation.

DETAILED DESCRIPTION

In the following description, detailed description of well-known functions or constructions incorporated herein may be omitted to avoid obscuring the subject matter of the present invention. Hereinafter, preferred embodiments of the present invention will be described with reference to the accompanying drawings. Prior to the description of the present invention, an LTE system and carrier aggregation will be briefly described.

Figure 1:
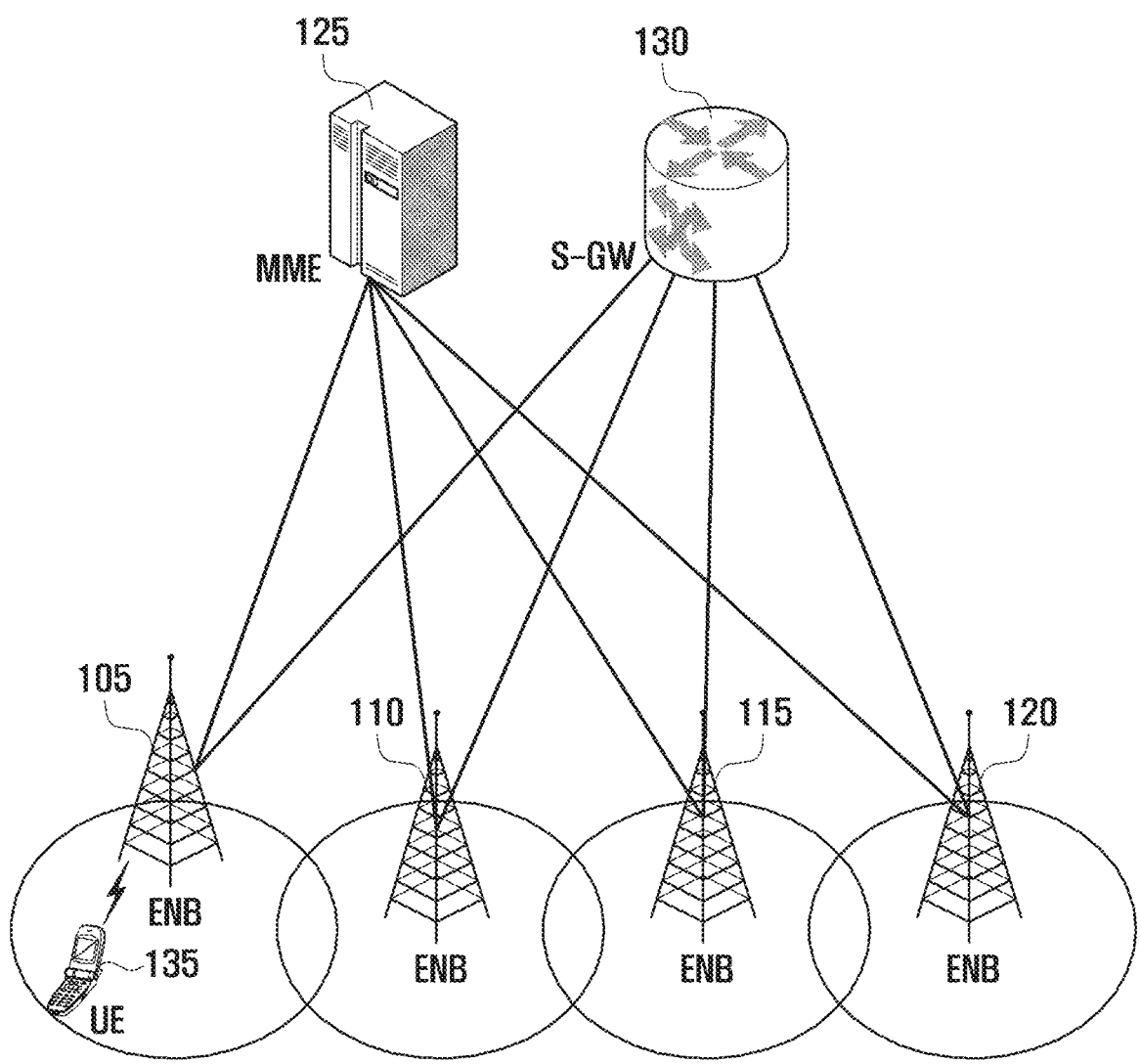
FIG. 1 is a view illustrating the structure of an LTE system to which some embodiments of the present invention are applied.

FIG. 1 is a view illustrating the structure of an LTE system to which some embodiments of the present invention are applied.

Referring to FIG. 1, a radio access network of an LTE system includes Evolved Node Bs (hereinafter referred to as "ENBs", "Node Bs", or "base stations") 105, 110, 115, and 120, a Mobility Management Entity (MME) 125, and a Serving-Gateway (S-GW) 130. User Equipment (hereinafter referred to as "UE" or "terminal") 135 is connected to an external network through the ENBs 105, 110, 115, and 120 and the S-GW 130.

In FIG. 1, the ENBs 105, 110, 115, and 120 correspond to the existing Node Bs of an UMTS system. The ENBs 105, 110, 115, and 120 are connected through a radio channel and performs more complicated role than the role of the existing Node Bs. Since all user traffics including a real-time service, such as a Voice over IP (VoIP) through the Internet protocol are serviced through a shared channel, a device that performs scheduling through gathering of status information, such as a buffer status of UE, an available transmission power status, or a channel status, is necessary, and the ENBs 105, 110, 115, and 120 take charge of this. One of the ENBs 105, 110, 115, and 120 typically controls a plurality of cells. In order to implement a transmission speed of 100 Mbps, the LTE system uses Orthogonal Frequency Division Multiplexing (hereinafter referred to as "OFDM") in the bandwidth of 20 MHz as a radio connection technology. Further, the ENBs 105, 110, 115, and 120 use Adaptive Modulation & Coding (hereinafter referred to as "AMC") that determines a modulation scheme and a channel coding rate to match the channel status of the UE 135.

The S-GW 130 is a device that provides a data bearer, and generates or removes the data bearer in accordance with the control of the MME 125. The MME 125 is a device that takes charge of not only mobility management of the UE 135 but also various kinds of control functions, and is connected to a plurality of ENBs.

Figure 2:
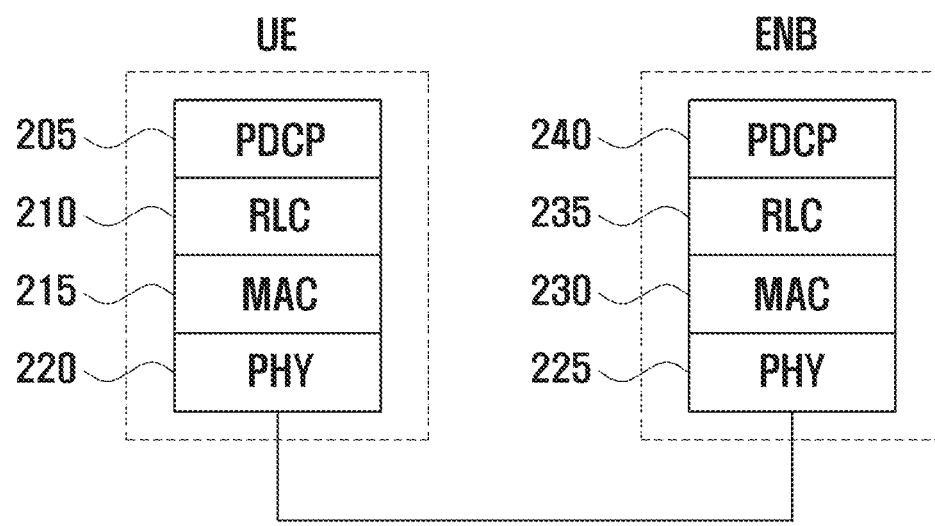
FIG. 2 is a diagram illustrating a radio protocol structure in an LTE system to which some embodiments of the present invention are applied.

FIG. 2 is a diagram illustrating a radio protocol structure in an LTE system to which some embodiments of the present invention are applied.

Referring to FIG. 2, a radio protocol of an LTE system is composed of a Packet Data Convergence Protocol (PDCP) 205 or 240, a Radio Link Control (RLC) 210 or 235, and a Medium Access Control (MAC) 215 or 230 in each of UE and ENB.

The Packet Data Convergence Protocol (PDCP) 205 or 240 takes charge of IP header compression/decompression operation, and the Radio Link Control (RLC) 210 or 235 performs ARQ operation through reconfiguration of a PDCP Packet Data Unit (PDU) with an appropriate size. The MAC 215 or 230 is connected to various RLC layer devices configured in one UE, and performs multiplexing of RLC PDUs to a MAC PDU and demultiplexing of RLC PDUs from the MAC PDU. A physical layer 220 or 225 performs channel coding and modulation of upper layer data and produces an OFDM symbol to transmit the OFDM symbol to a radio channel, or performs demodulation and channel decoding of an OFDM symbol that is received through the radio channel to transfer the demodulated and decoded OFDM symbol to an upper layer.

Figure 3:
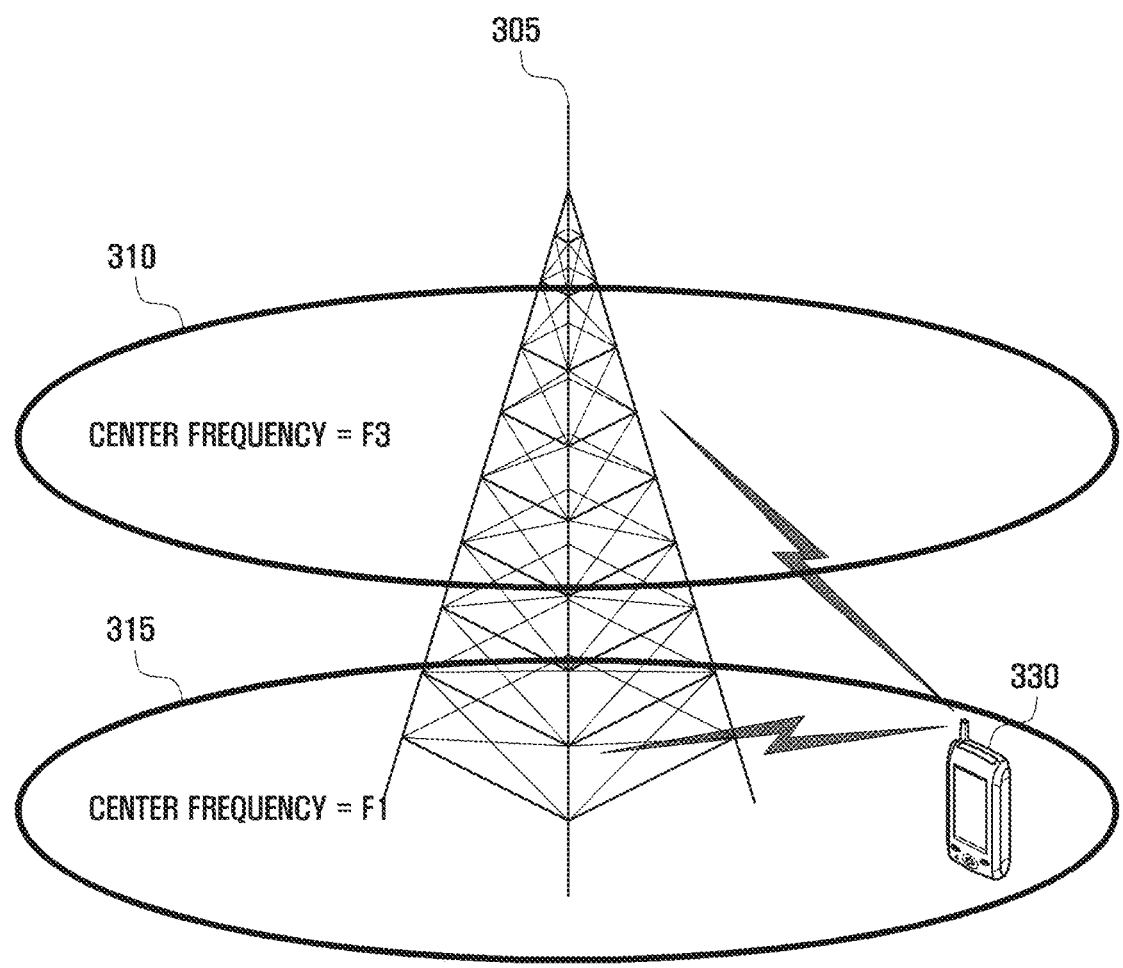
FIG. 3 is a view explaining intra-ENB carrier aggregation to which some embodiments of the present invention are applied.

FIG. 3 is a view explaining intra-ENB carrier aggregation to which some embodiments of the present invention are applied.

Referring to FIG. 3, one ENB may generally transmit and receive multicarriers through various frequency bands. For example, in the case where a carrier 315 having a forward center frequency of f1 and a carrier 310 having a forward center frequency of f3 are transmitted from the ENB 305, one UE transmits/receives data using one of the two carriers in the related art. However, UE having carrier aggregation ability may transmit/receive data through several carriers at the same time. The ENB 305 may heighten the transmission speed of the UE 330 by allocating much more carriers to the terminal 330 having the carrier aggregation ability according to the situation. As described above, aggregation of a forward carrier and reverse carriers that one ENB transmits and receives is called intra-ENB carrier aggregation. However, according to circumstances, unlike that as illustrated in FIG. 3, it may be necessary to aggregate the forward carrier and the reverse carriers that different ENBs transmit and receive.

Figure 4:
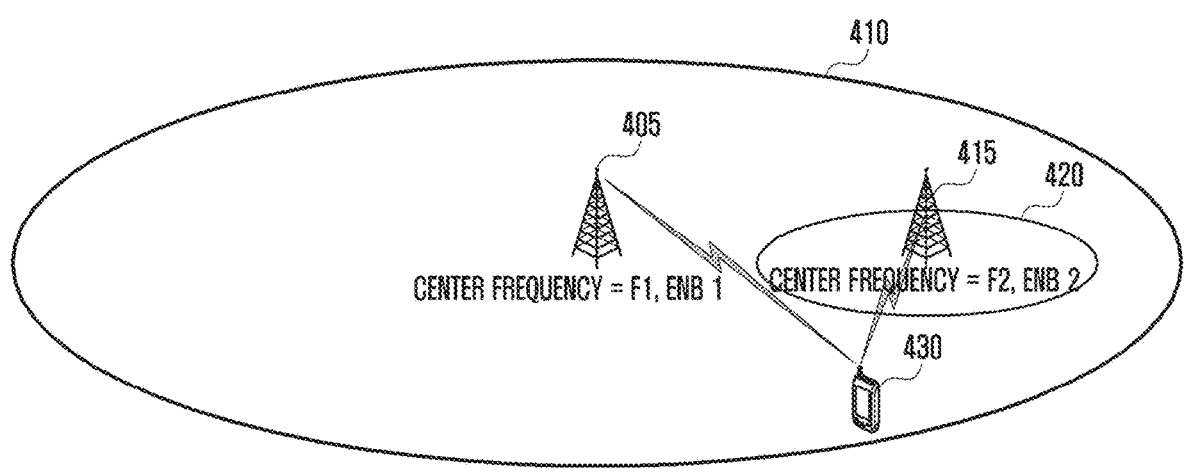
FIG. 4 is a view illustrating a carrier aggregation type according to an embodiment of the present invention.

FIG. 4 is a view illustrating an inter-ENB carrier that is a carrier aggregation type according to an embodiment of the present invention.

Referring to FIG. 4, if UE 430 aggregates (combines) a carrier having a forward center frequency of f1 and a carrier having a forward center frequency of f2 in the case where ENB 1 405 transmits/receives a carrier having a center frequency of f1 and ENB 2 415 transmits/receives a carrier having a center frequency of f2, this results in that one UE aggregates carriers that are transmitted/received from two or more ENBs, and in the description of the present invention, this is called inter-ENB carrier aggregation (or inter-ENB CA).

Hereinafter, wordings to be frequently used in the description of the present invention will be described.

If it is assumed that as a traditional meaning, one forward carrier that one ENB transmits and one reverse carrier that the ENB receives constitute one cell, carrier aggregation may be understood that UE simultaneously transmits/receives data through several cells. In this case, the maximum transmission speed is increased in proportion to the number of carriers being aggregated.

Hereinafter, in the description of the present invention, that UE receives data through a certain forward carrier or transmits data through a certain reverse carrier has the same meaning as that the UE transmits/receives data using a control channel and a data channel provided from a cell corresponding to the center frequency and the frequency band that specify the carrier. In the description of the present invention, the carrier aggregation will be particularly expressed as "a plurality of serving cells is configured", and in this regard, wordings, such as a primary serving cell (hereinafter, PCell) and a secondary serving cell (hereinafter, SCell), or activated serving cells, will be used. The above-described wordings have the meanings as they are used in an LTE mobile communication system. In the present invention, wordings, such as a carrier, a component carrier, and a serving cell, are commonly used.

In the description of the present invention, a set of serving cells that are controlled by the same ENB is defined as a Cell Group or a Carrier Group (CG). The cell group is further divided into a Master Cell Group (MCG) and a Secondary Cell Group (SCG). The MCG means a set of serving cells which are controlled by an ENB that controls the PCell (hereinafter, Master ENB (MeNB)), and the SCG means a set of serving cells which are controlled by an ENB that is not the ENB that controls the PCell, in other words, a set of serving cells which are controlled by an ENB that controls only the SCells (hereinafter, Slave ENB (SeNB)). Whether a specific serving cell belongs to the MCG or SCG is configured by the ENB in a process of configuring the corresponding serving cell. One MCG and one or more SCGs may be configured in one UE. In the present invention, for convenience in explanation, a case where one SCG is configured is considered. However, even more than one SCG is configured, the present invention can be applied as it is without any specific change.

Referring to FIG. 4, if it is assumed that ENB 1 405 is a MeNB and ENB 2 415 is a SeNB, a serving cell 410 having the center frequency of f1 is a serving cell that belongs to the MCG, and a serving cell 420 having the center frequency of f2 is a serving cell that belongs to the SCG.

In the following description, for understanding, other wordings may be used other than the MCG and the SCG. For example, wordings, such as primary configuration and secondary configuration, or a primary carrier group and a secondary carrier group, may be used. However, in this case, it is to be noted that only the wordings differ, but their meanings are the same. The main usage purpose of such words is to discriminate which cell is controlled by the ENB that controls the PCell of a specific ENB, and the operations of the UE and the corresponding cell may differ depending on whether the cell is controlled by the ENB that controls a PCell of a specific terminal.

In general, one user service is serviced by one Evolved Packet System (EPS) bearer, and one EPS bearer is connected to one radio bearer. The radio bearer is composed of a PDCP and an RLC, and in the inter-ENB CA, a PDCP device and an RLC device of one radio bearer may be positioned between different ENBs to increase data transmission/reception efficiency. In this case, different accessing methods are necessary in accordance with the kind of a user service. For example, in the case of a large-capacity data service, the user service may form two RLC devices, like 515, and transmit/receive data with both the MeNB and the SeNB. In the case of a service having a severe QoS requirement, such as VoLTE, the user service may put an RLC device only in the MeNB, like 505, and transmit/receive data using only a serving cell of the MeNB. If a macro cell has no available transmission resource even in the case of a large-capacity data service, the user service may put the RLC device only in the SeNB, like 510, and transmit/receive data using only a serving cell of the SeNB. In this case, 505 is called a single LCH MCG bearer single-LCH-MCG-RB, 510 is called a single LCH SCG bearer single-LCH-SCG-RB, and 515 is called a multi-LCH bearer multi-LCH-RB.

In general, high-speed data transmission/reception is required in a downlink. This is because in most Internet services, data transmission is performed through the downlink, and only a control message (e.g., HTTP request or TCP ACK) related to the data transmission is transmitted through an uplink. In contrast, in the case where the UE transmits data to both the MeNB and the SeNB through the uplink, there is a possibility that the UE inaccurately reports a buffer status and thus transmission resources are wasted. The amount of data that the UE can transmit to the ENB is written as a buffer status. The amount of data that can be transmitted is the sum of data that is stored in the PDCP device and data that is stored in the RLC device. The UE individually reports a buffer status to the MeNB and the SeNB, and in the case of the multi-LCH-RB, the data stored in the PDCP device is included in not only a BS that is reported to the MeNB but also a BS that is reported to the SeNB to cause waste of the transmission resources.

According to the present invention, in order to solve the above-described problem, it is defined that for the uplink, data of a certain RB is transmitted only through the MCG or the SCG. Further, for the bearer that exceptionally requires extremely high reliability, duplicate data transmission is performed through the MCG and the SCG. In the present invention, 5 types of RBs are defined as below with respect to the uplink. The term "LCH" means a logical channel, is a logical path between the RLC and the MAC, and indicates which RLC device certain data is related to. Accordingly, the wordings "RLC device" and "LCH" are exchangeable with each other. The term "MCG-LCH" is a logical channel that is configured with respect to serving cells of the MCG, and through the MCG-LCH, data, which is transmitted/received with the MCG serving cell, among data of the corresponding RB is processed. One or two LCHs may be configured with respect to one RB. In the case where two logical channels are configured, one is the MCG-LCH, and the other is the SCG-LCH.

single-LCH-MCG-RB 605: This is an RB in which only one RLC device exists and uplink data transmission is performed only through the MCG. In calculating the BS of the RB, the UE makes both PDCP data 630 and RLC data 635 of the corresponding RB included therein. The RLC data is composed of RLC control data 640, data 645 stored in an RLC transmission buffer, and data 650 stored in an RLC retransmission buffer. The RLC control data is an RLC status report message (control message of an RLC layer in which RLC ACK information and NACK information are accommodated). The RLC control data of the uplink is ACK/NACK information of the RLC data of the downlink. The RLC data stored in the transmission buffer is RLC data that has not yet been transmitted. The RLC data stored in the retransmission buffer is RLC data that has already been transmitted once, and is composed of data (also called an outstanding packet) of which the ACK/NACK information has not yet been received and the retransmission has not yet been confirmed and data of which the NACK is indicated and the retransmission is required. In the BS, only a packet of which the retransmission is required among the RLC data stored in the retransmission buffer, except for the outstanding packet, is reflected.

single-LCH-SCG-RB 610: This is an RB in which only one RLC device exists and uplink data transmission is performed only through SCG. In calculating BS of the RB, the UE makes both PDCP data and RLC data of the corresponding RB be included therein.

multi-LCH-MCG-RB 615: This is an RB in which two RLC devices exist, but uplink data transmission is performed only through MCG. That is, PDCP data is transferred only to MCG-LCH (or MCG-RLC device) 640, and only RLC control data of downlink data of the corresponding RB is transmitted to SCG-LCH (or SCG-RLC device) 645. In calculating BS of the RB, the UE reflects both a PDCP data amount and an RLC data amount in the BS 650 that is reported through MCG (or to MeNB), and reflects only an RLC control data amount in BS 655 that is reported through SCG (or to SeNB).

multi-LCH-SCG-RB 620: This is an RB in which two RLC devices exist, but uplink data transmission is performed only through SCG. That is, PDCP data is transferred only to SCG-LCH (or SCG-RLC device), and only RLC control data of downlink data of the corresponding RB is transmitted to MCG-LCH (or MCG-RLC device). In calculating BS of the RB, the UE reflects only an RLC control data amount in the BS 660 that is reported through MCG (or to MeNB), and reflects both an PDCP data amount and an RLC data amount in BS 665 that reported through SCG (or to SeNB).

multi-LCH-duplicate-RB 625: Two RLC devices exist, and duplicate transmission of uplink data is performed through SCG and MCG. In the case where the UE is positioned in the neighborhood of a macro cell, the UE transmits the same data in overlap through both the macro cell and a small cell, and thus mobility failure can be greatly reduced. Accordingly, the multi-LCH-duplicate-RB is configured with respect to SRB when a predetermined condition is satisfied (i.e., when inter-ENB CA is configured in the UE that is on the boundary of the macro cell). The PDCP data is transmitted through both SCG-LCH and MCG-LCH, and the UE reflects the PDCP data amount and the RLC data amount in both BS 670 that is reported through MCG and BS 675 that is reported through SCG.

Figure 5:
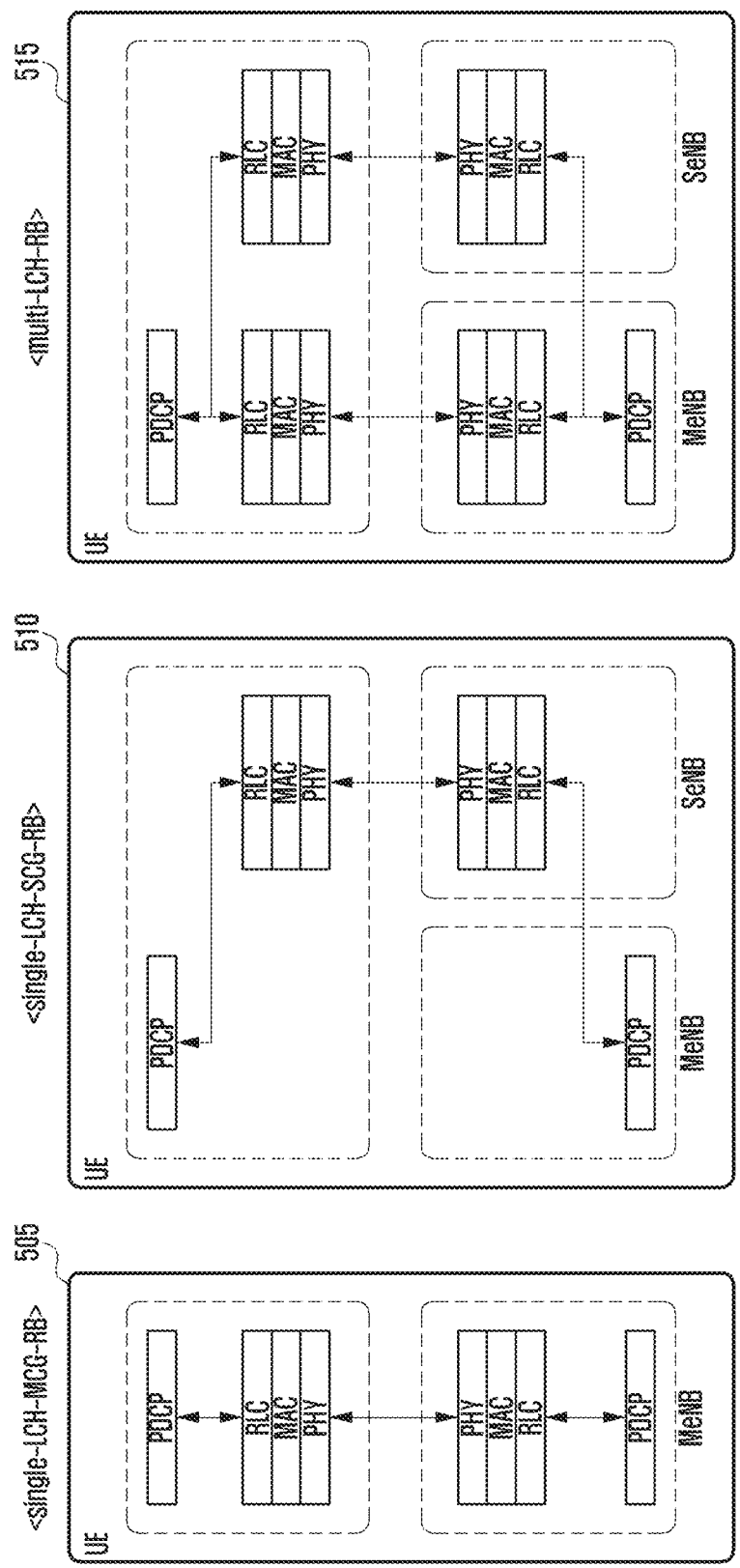
FIG. 5 is a diagram illustrating the structure of a radio bearer.
Figure 6:
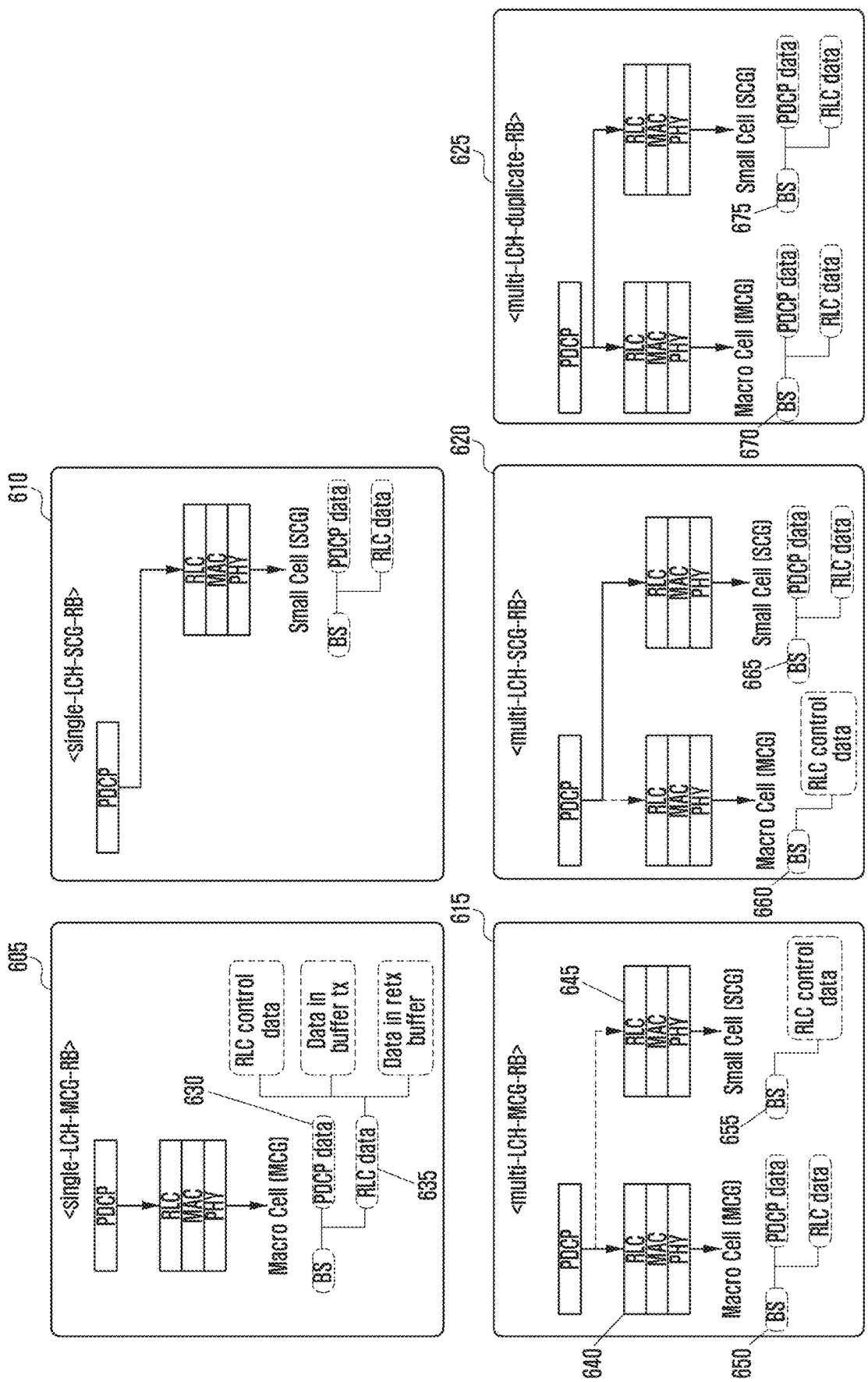
FIG. 6 is a diagram illustrating the uplink structure of a radio bearer.

Both a downlink and an uplink exist in one RB. The 5 RB types proposed in FIG. 6 correspond to the uplink, and the three RB types proposed in FIG. 5 correspond to the downlink. The mapping relationship between them is arranged in Table 1 below.

TABLE 1

| Uplink | Downlink | Purpose |
|---|---|---|
| single-LCH-MCG-RB | single-LCH-MCG-RB | Service that is sensitive to service interruption or delay, like VoLTE |
| single-LCH-SCG-RB | single-LCH-SCG-RB | Service that requires high-speed data transmission/reception, like FTP. Since macro cell has no room for transmission resources, multi-LCH structure has no gain. |
| multi-LCH-RB | multi-LCH-MCG-RB | Service that requires high-speed data transmission/reception, like FTP. Since macro cell has enough room for transmission resources, multi-LCH structure has a gain, and there is no room in uplink of small cell. |

TABLE 1-continued

| Uplink | Downlink | Purpose |
|---|---|---|
| | multi-LCH-SCG-RB | Service that requires high-speed data transmission/reception, like FTP. Since macro cell has enough room for transmission resources, multi-LCH structure has a gain, and there is enough room in uplink of small cell. |
| | multi-LCH-duplicate-RB | Service in which transmission reliability is important, like RRC. In particular, UE is positioned on boundary of macro cell, and reliability provided from macro cell is insufficient. |

Figure 7:
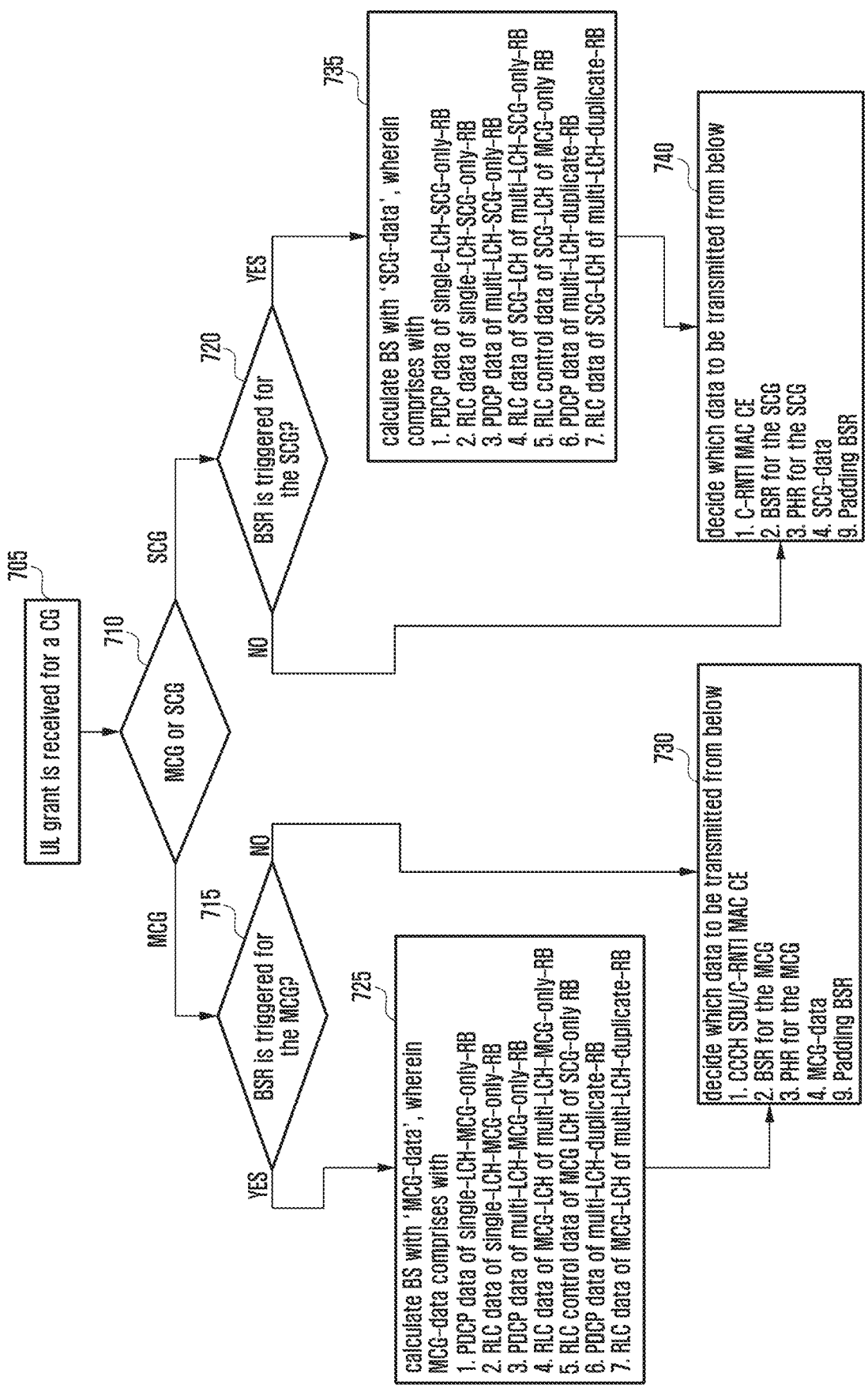
FIG. 7 is a diagram explaining the operation of UE that has received an uplink grant.

FIG. 7 is a diagram explaining the operation of UE that has received an uplink grant. FIG. 7 shows the operation of the UE in which inter-ENB CA is configured when the UE receives the uplink grant.

At step 705, the UE receives uplink grant (control information received through a physical downlink control channel; including information, such as transmission resources to be used for uplink transmission, MCS level, and whether to be initially transmitted) from a certain serving cell. The serving cell is a serving cell that belongs to a certain CG, and indicates uplink transmission to one of serving cells of the corresponding CG.

At step 710, the UE checks whether CG is MCG or SCG. This is because the kind of data that the UE reflects in the BS in the case of the MCG is different from the kind of data that the UE reflects in the BS in the case of the SCG. If the uplink grant refers to the serving cell of the MCG, the UE proceeds to step 715. If the uplink grant refers to the serving cell of the SCG, the UE proceeds to step 720.

At step 715, the UE checks whether a Buffer Status Report (BSR) has been triggered with respect to the MCG, but has not yet been canceled. The BSR is a MAC CE that accommodates BS information for a Logical Channel Group (LCG) therein. The LCG is a group of a logical channel, and in each BS, information about a summed amount of transmittable data of the logical channel that belongs to the corresponding LCG is reflected. The fact that the BSR is triggered with respect to the MCG means that the following event has occurred.

Transmittable data that satisfies the following conditions has been newly generated in the logical channel that belongs to the LCG. Hereinafter, the following data is commonly called "MCG-data".
PDCP data and RLC data of single-LCH-MCG-RB
PDCP data of multi-LCH-MCG-RB
RLC data of MCG-LCH of multi-LCH-MCG-RB
RLC control data of MCG-LCH of multi-LCH-SCG-RB
PDCP data of multi-LCH-duplicate-RB
RLC data of MCG-LCH of multi-LCH-duplicate-RB
The logical channel priority of MCG-data that has been newly generated as described above is higher than the logical channel priority of the existing MCG-data.

If the above-described situation has occurred, it means that data having priority that is higher than the priority of data stored in the UE has newly occurred, and the UE triggers a regular BSR If a predetermined timer expires, the UE also triggers a periodic BSR.

If the BSR has been triggered, but has not yet been canceled, the UE proceeds to step 725, and if the BSR has not been triggered or has been canceled after being triggered, the UE proceeds to step 730. If the triggered BSR is included in MAC PDU of which the transmission is scheduled, it is canceled.

At step 725, the UE calculates BS of each LCG through reflection of "MCG-data". That is, the UE calculates the BS through summing of the transmittable RLC data of LCH that belongs to LCG by LCGs and only MCG-data of PDCP data of PDCP connected to LCH. For example, if LCH 3 and LCH 4 belong to a certain LCG, LCH 3 is LCH of single-LCH-MCG-RB, and LCH 4 is LCH of multi-LCH-SCG-RB, the UE considers both PDCP data and RLC data with respect to LCH 3, and considers only RLC control data with respect to LCH 4. The UE determines BS of the corresponding LCG through summing of the two.

At step 730, the UE determines data to be transmitted using the uplink grant. The UE checks whether there is CCCH SDU or C-RNTI MAC CE to be first transmitted, and if so, the UE preferentially includes the same in MAC PUD. The UE checks whether there is BSR that is triggered with respect to MCG, and if so (and if there is a space in which the triggered BSR is to be included), the UE includes PHR in MAC PDU. The UE performs the above-described process, and if a surplus space still remains in the MCA PDU, the UE selects data to be transmitted through reflection of the priority of MCG-data with respect to pieces of MCG-data. That is, the UE preferentially transmit the data having high logical channel priority among the pieces of MCG-data. CCCH SDU follows those described in the standards 36.331 and 36.321. C-RNTI MAC CE and PHR follow those described in the standard 36.321.

If a surplus space remains even if all pieces of MCG-data are included, the UE includes a padding BSR therein, and fills the remaining space with padding bits. Further, the UE transmits the MAC PDU to the uplink and terminates the process.

At step 720, the UE checks whether BSR has been triggered with respect to SCG, and if it has been triggered, the UE proceeds to step 735 while if it has not been triggered, the UE proceeds to step 740.

The fact that BSR has been triggered with respect to SCG means that a regular BSR has been triggered with respect to SCG, or a periodic BSR has been triggered with respect to SCG. If the following event occurs, the regular BSR is triggered with respect to SCG.

Transmittable data that satisfies the following conditions has been newly generated in the logical channel that belongs to the LCG. Hereinafter, the following data is commonly called "SCG-data".
PDCP data and RLC data of single-LCH-SCG-RB
PDCP data of multi-LCH-SCG-RB
RLC data of SCG-LCH of multi-LCH-SCG-RB
RLC control data of SCG-LCH of multi-LCH-MCG-RB
PDCP data of multi-LCH-duplicate-RB
RLC data of SCG-LCH of multi-LCH-duplicate-RB
The logical channel priority of SCG-data that has been newly generated as described above is higher than the logical channel priority of the existing SCG-data.

If a predetermined timer that is set by ENB expires, a periodic BSR is triggered with respect to SCG.

At step 735, the UE calculates BS of each LCG through reflection of SCG-data. That is, the UE calculates the BS through summing of the transmittable RLC data of LCH that belongs to LCG by LCGs and only LCG-data of PDCP data of PDCP connected to the LCH. Then, the UE proceeds to step 740.

At step 740, the UE determines data to be transmitted using the uplink grant. The UE checks whether there is C-RNTI MAC CE to be first transmitted, and if so, the UE preferentially includes the same in MAC PUD. The UE checks whether there is BSR that is triggered with respect to SCG, and if so (and if there is a space in which the triggered BSR is to be included), the UE generates BSR and includes the BSR in MAC PDU. Next, the UE checks whether there is PHR that is triggered with respect to SCG, and if so (and if there is a space in which the triggered PHR is to be included), the UE includes the PHR in MAC PDU. The UE performs the above-described process, and if a surplus space still remains in the MCA PDU, the UE selects data to be transmitted through reflection of the priority of SCG-data with respect to pieces of MCG-data. That is, the UE preferentially selects data having high logical channel priority among the pieces of SCG-data.

If a surplus space remains even if all pieces of SCG-data are included, the UE includes a padding BSR therein, and fills the remaining space with padding bits. Further, the UE transmits the MAC PDU to the uplink and terminates the process.

The logical channel priority is configured by logical channels, and the ENB instructs the UE. If one logical channel is configured with respect to one bearer, the UE applies the logical channel priority as the priority of data that is generated in a PDCP device connected to the logical channel. If two logical channels are configured with respect to one bearer, the UE should determine of which logical channel the priority is to be applied to data generated in the PDCP device. In the present disclosure, in configuring the logical channel and the bearer to the UE, the ENB also configures of which logical channel the logical channel priority is to be applied. The above-described configuration may be explicit or implicit. In configuring a PDCP entity, the explicit configuration is for the ENB to explicitly instruct of which logical channel the priority is applied to the data of the PDCP entity when the PDCP entity is connected to two or more (or several) logical channels. The implicit configuration is, if the PDCP entity is connected to two or more logical channels when data is generated from a certain PDCP entity, to apply the logical channel priority of MCG LCH of RB in the case where the corresponding RB is multi-LCH-MCH-RB and to apply the logical channel priority of SCG LCH of the RB in the case where the corresponding RB is multi-LCH-SCG-RB.

Figure 8:
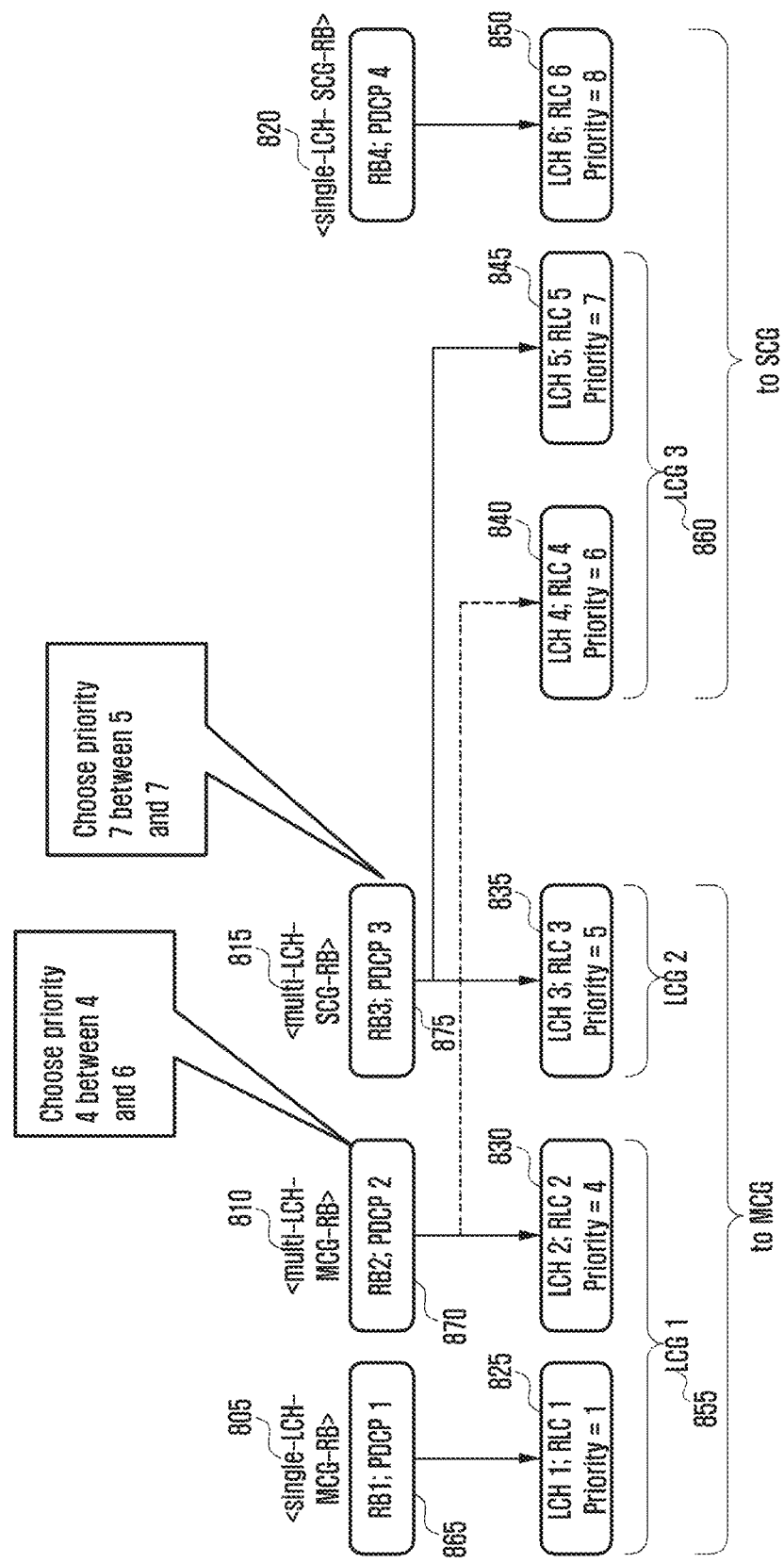
FIG. 8 is a diagram explaining the operation of determining priority of PDCP data of a multi-LCH bearer.

For example, as illustrated in FIG. 8, it is assumed that in the UE, LCH 1 825, LCH 2 830, LCH 3 835, LCH 4 840, LCH 5 845, and LCH 6 850 are configured, and RB 1 805, RB 2 810, RB 3 815, and RB 4 820 are configured. In this case, LCH 1 and LCH 2 belong to LCG 1, LCH 3 belongs to LCG 2, and LCH 4 an LCH 5 belong to LCG 3. LCH 6 does not belong to LCG. When a new transmittable data is generated in PDCP 1, the UE determines whether to trigger BSR with respect to MCG in consideration of the priority of the transmittable data stored in LCH 1, LCH 2, and LCH 3, which are MCG LCHs, and the transmittable data stored in PDCP 1 and PDCP 2 of RB 1 and RB 2, which are MCG-RBs. That is, if the priority of the transmittable data is lower than the priority of the data generated in the PDCP 1, for example, if the data is stored only in LCH 2 and LCH 3, the UE triggers BSR with respect to MCG.

When new transmittable data is generated in PDCP 2, the UE, in the same manner, determines whether to trigger BSR through comparison of the priority of the data stored in LCH1, LCH 2, LCH 3, PDCP1, and PDCP2 and the priority of the data that is newly generated. In this case, as the priority of the data stored in the PDCP 2, "4" that is the priority of LCH 2, may be applied according to the following rules.

<Rule 1>

The priority of data stored in PDCP that is connected to two or more logical channels follows the priority of MCG-LCH if the corresponding RB is MCG-RB, and follows the priority of SCG-LCH if the RB is SCG-LCH.

The priority of data stored in PDCP connected to two or more logical channels may be determined in the unit of PDCP PDU or PDCP SDU. The priority of a certain PDCP SDU stored in DPCP of multi-bearer connected to two or more logical channels may be determined by applying the priority of MCG-LCH or the priority of SCG-LCH in accordance with time and situations. The determination of the priority in the unit of PDCP SDU or PDU may be applied in the case of transmitting PDCP data of the multi-bearer through both MCG and SCG.

In the case of determining the priority in the unit of PDCP SDU or PDU, the following rules may be applied.

<Rule 2>

The priority of a single bearer is fixed to one, but the priority of a multi-bearer is determined by any one of the priority of MCG-LCH and the priority of SCG-LCH at a time when new uplink transmission becomes possible in MCG or SCG. The time when the new uplink transmission becomes possible may be, for example, a time when an uplink transmission resource for new transmission is allocated or a time when a configured uplink transmission resource (configured uplink grant) occurs. If the new uplink transmission with respect to a certain cell group becomes possible in a certain sub-frame, in determining data to be transmitted using the uplink transmission resource of the cell group in the sub-frame, the UE determines the priority of PDCP SDUs stored in a multi-bearer PDCP in accordance with the priority of the logical channel of the corresponding cell group. For example, if the new uplink transmission with respect to the MCG serving cell becomes possible at a certain time, the UE applies the priority of MCG-LCH as the priority of PDCP SDUs of the multi-bearer. Further, if the new uplink transmission with respect to the SCG serving cell becomes possible at another certain time, the UE applies the priority of SCG-LCH as the priority of the PDCP SDUs of the multi-bearer.

Specifically, in determining the data to be transmitted using the uplink transmission resource of MCG, or in deciding whether to transmit data that is stored in PDCP of a certain multi-bearer (multi-LCH RB) using the MCG uplink transmission resource, the UE considers the priority allocated to MCG-LCH of a multi-bearer and the transmittable data amount stored in PDCP and MCG-RLC, the priority allocated to MCG-LCH of another multi-bearer and the transmittable data amount stored in PDCP, and the priority allocated to single-LCH-MCG-RB and the transmittable data amount stored in a PDCP device and an RLC device.

In determining the data to be transmitted using the uplink transmission resource of SCG, or in deciding whether to transmit data that is stored in PDCP of a certain multi-bearer (multi-LCH RB) using the SCG uplink transmission resource, the UE considers the priority allocated to SCG-LCH of a multi-bearer and the transmittable data amount stored in PDCP and SCG-RLC, the priority allocated to SCG-LCH of another multi-bearer and the transmittable data amount stored in PDCP, and the priority allocated to single-LCH-MCG-RB and the transmittable data amount stored in a PDCP device and an RLC device.

For example, if n-byte grant is received from SCell of SCG at a certain time t0, the UE applies the priority of LCH 4 with respect to the transmittable data stored in PDCP 2, and applies the priority of LCH 5 with respect to the transmittable data stored in PDCP 3. Further, the UE decides which data is to be transmitted in consideration of the transmittable data amount of PDCP 2, the transmittable data amount of PDCP 3, the transmittable data amount of PDCP 4 that is single-LCH-SCG-RB, and the respective priorities. For convenience in explanation, it is assumed that the transmittable data does not exist in RLCs.

Further, if m-byte grant is received from SCell of MCG at a certain time t1, the UE applies the priority of LCH 2 with respect to the transmittable data stored in PDCP 2, and applies the priority of LCH 3 with respect to the transmittable data stored in PDCP 3. Further, the UE decides which data is to be transmitted in consideration of the transmittable data amount of PDCP 2, the transmittable data amount of PDCP 3, the transmittable data amount of PDCP 1 that is single-LCH-MCG-RB, and the respective priorities. For convenience in explanation, it is assumed that the transmittable data does not exist in RLCs.

<Rule 3>

If SDU occurs (or SDU is transferred from an upper layer) with respect to transmittable PDCP SDU and PDU stored in a multi-bearer, the UE determines of which LCH the priority is to be applied to the PDCP SDU. The UE may determine which priority is to be applied to PDCP SDU according to a specific probability value that is pre-instructed by the MeNB. For example, if the MeNB instructs a probability value of "0.3:0.7" with respect to a certain multi-bearer, the UE may apply the priority of MCG-LCH with respect to 30% of SDUs among PDCP SDUs of the multi-bearer, and may apply the priority of SCG-LCH with respect to 70% of SDUs. A time when determining the priority to be applied to a certain SDU may be, for example, a time when PDCP SDU is stored in a PDCP transmission buffer, a time when PDCP SDU arrives at a PDCP device, a time when a single bearer is switched over to a multi-bearer (after a control message that instructs to reconfigure a single bearer to a multi-bearer is received and successfully interpreted), a time when SCG is initially configured and uplink transmission becomes possible in the SCG (e.g., a time when the UE that is instructed to configure SCG successfully completes a random access in PSCell.

When new transmittable data occurs in PDCP 3 that belongs to SCG-RB, the UE determines whether to trigger BSR with respect to SCG in consideration of data of SCG-RB and data of SCG-LCH. That is, the UE compares the priority of the transmittable data pre-stored in PCP 3, LCH 4, and LCH 6 with the priority of the newly generated data. The priority of the transmittable data of PDCP 3 is "7" that is the priority of LCH 5 according to rule 1. For reference, PDCP 4 does not belong to LCG, and thus is not considered during comparison of the priorities If BSR is triggered with respect to MCG and uplink grant with respect to MCG serving cell becomes available, the UE calculates BS with respect to LCG 1 and BS with respect to LCG 2. The sum of data of LCH 1, data of LCH 2, data of PDCP 1, and data of PDCP 2 is reflected in the BS of LCG 1. Data of LCH 3 is reflected in the BS of LCG 2. Data of LCH x is called transmittable data of an RLC device of logical channel x.

In selecting data to be transmitted through an uplink of a serving cell of MCG, the UE selects the data of LCH 1, LCH 2, and LCH 3, which are MCG-LCHs, and PDCP 1 and PDCP 2, which are MCG-RBs, in consideration of the priority of the data.

In selecting data to be transmitted through an uplink of a serving cell of SCG, the UE selects the data of LCH 4, LCH 5, and LCH 6, which are SCG-LCHs, and PDCP 3 and PDCP 4, which are SCG-RBs, in consideration of the priority of the data.

Referring to FIG. 8, multi-LCH-RB is related to two or more LCGs. For example, since PDCP 3 815 is connected to LCH 3 and also to LCH 5, it is related to LCG 2 and also to LCG 3. The UE is required to determine of which LCG the BS includes data of PDCP related to a plurality of LCGs as described above. In determining LCG to which certain PDCP data is to be reported, if the PDCP is related to one LCG, the UE reports this through reflection of the data of the PDCP in BS of the corresponding LCG. If the PDCP is related to two or more LCGs, the UE determines whether to reflect the PDCP data in BS of a certain LCG by applying a specific rule.

<Rule that Determines of which LCG BS Reflects PDCP Data>

If PDCP is multi-LCH-MCG-RB, PDCP data is reflected in BS of LCG to which MCG-LCH belongs If PDCP is multi-LCH-SCG-RB, PDCP data is reflected in BS of LCG to which SCG-LCH belongs According to the above-described rule, in the embodiment of FIG. 8 as described above, data of PDCP 2 that is multi-LCH-MCG-RB is reflected in BS of LCG 1 to which LCH 2 that is MCG-LCH belongs. Data of PDCP 3 that is multi-LCH-SCG-RB is reflected in BS of LCG 3 to which LCH 5 that is SCG-LCH belongs.

Figure 19:
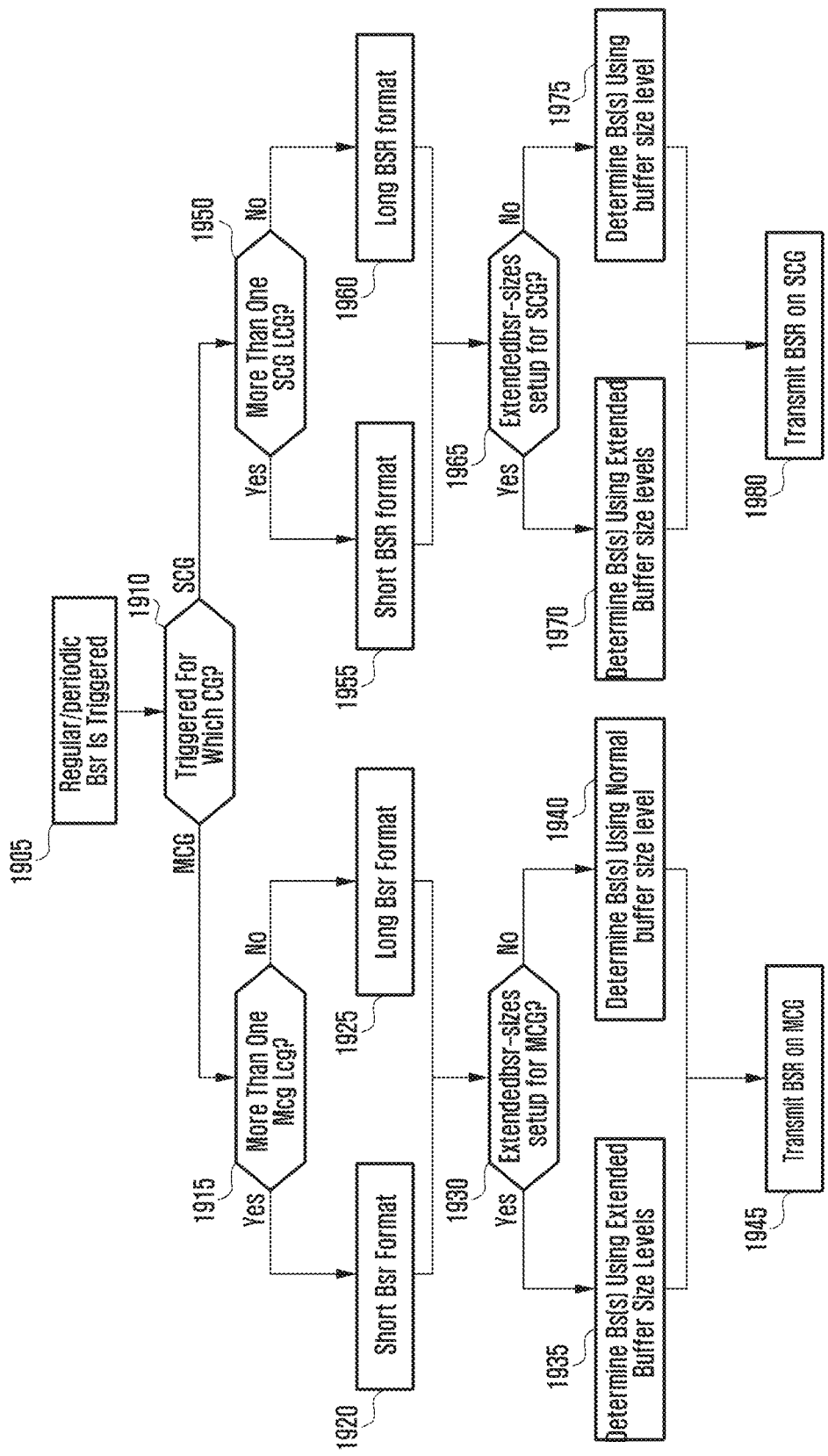
FIG. 19 is a diagram explaining the operation of UE that determines PDCP data to be reflected in a BS of an LCG in the case where a PDCP is related to two or more LCGs.

In relation to this, the operation of the UE is illustrated in FIG. 19.

At step 1905, a regular BSR or a periodic BSR is triggered in the UE in which two or more CGs are configured.

At step 1910, the UE checks to which CG the BSR is triggered. If the BSR is triggered with respect to MCG, the UE proceeds to step 1915, whereas if the BSR is triggered with respect to SCG, the UE proceeds to step 1950.

At step 1915, the UE checks whether transmittable data exists in at least two MCG LCGs. Transmittable data of a certain MCG LCG includes transmittable data of an RLC device of LCH and transmittable PDCP data of MCG LCG.

Transmittable PDCP data of a specific MCG LCG (e.g., LCG 1 855) is transmittable data stored in a PDCP device 865 of LCH that belongs to the corresponding MCG LCG of LCH (e.g., 805) corresponding to single-LCH-MCG-RB, and transmittable data stored in a PDCP device 870 of LCH that belongs to MCG LCH (e.g., 830) of LCH (e.g., 830 or 840) corresponding to multi-LCH-MCG-RB (e.g., 810).

Transmittable PDCP data of a specific SCG LCG (e.g., LCG 3 860) is transmittable data stored in a PDCP device of LCH that belongs to the corresponding SCG LCG of LCHs corresponding to single-LCH-SCG-RB, and transmittable data stored in a PDCP device 875 of LCH that belongs to SCG LCH (e.g., 845) of LCHs (e.g., 835 and 845) corresponding to multi-LCH-SCG-RB (e.g., 815).

If the transmittable data exists only in one MCG LCG, the UE proceeds to step 1920 and selects a short BSR as a format of BSR The short BSR is a format that includes only one 6-bit BS. If the transmittable data exists in two or more MCG LCGs, the UE proceeds to step 1925 and selects a long BSR as a format of BSR The long BSR is a format that includes four 6-bit BSs.

At step 1930, the UE checks whether extended BSR-Sizes are set up in BSR configuration with respect to MCG (or MeNB, or a MAC device that connects MCG serving cells and MCG LCH). If extended BSR-Sizes are set up, the UE proceeds to step 1935, whereas if extended BSR-Sizes are not set up, the UE proceeds to step 1940. The BS is a 6-bit index. The BS with respect to a certain LCG is determined with reference to a specific buffer size level.

The buffer size level is divided into buffer size levels defined by Table 2 and Table 3. The buffer size level defined by Table 2 is called a normal buffer size level, and the buffer size level defined by Table 3 is called an extended buffer size level. The normal buffer size level is efficient in the case where an amount of backward data is not large, and the extended buffer size level is efficient in the case where the amount of backward data is large.

In determining BS of a certain LCG, the ENB instructs whether to refer to the normal buffer size level or the extended buffer size level, and the BS of a certain LCG is determined according to the following method.

With respect to LCG configured with respect to MCG, the ENB applies the extended buffer size level if extended BSR-Sizes are configured with respect to BSR for MCG, and applies the normal buffer size level if extended BSR-Sizes are not configured.

With respect to LCG configured with respect to SCG, the ENB applies the extended buffer size level if extended BSR-Sizes are configured with respect to BSR for SCG, and applies the normal buffer size level if extended BSR-Sizes are not configured.

Since different buffer size levels may be applied in BSR for MCG and BSR for SCG (e.g., the normal buffer size level may be applied when deciding the BS of MCG LCG and the extended buffer size level may be applied when deciding the BS of SCG LCG) and vice versa. Various kinds of buffer size levels may be configured in one UE. Accordingly, the UE selects an appropriate buffer size level depending on which CG the BSR is related to.

TABLE 2

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |

TABLE 2-continued

| Index | Buffer Size (BS) value [bytes] |
|---|---|
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

TABLE 3

| Index | Buffer Size (BS) value [bytes] |
|---|---|
| 0 | BS = 0 |
| 1 | 0 < BS <= 10 |
| 2 | 10 < BS <= 13 |
| 3 | 13 < BS <= 16 |
| 4 | 16 < BS <= 19 |
| 5 | 19 < BS <= 23 |
| 6 | 23 < BS <= 29 |
| 7 | 29 < BS <= 35 |
| 8 | 35 < BS <= 43 |
| 9 | 43 < BS <= 53 |
| 10 | 53 < BS <= 65 |
| 11 | 65 < BS <= 80 |
| 12 | 80 < BS <= 98 |
| 13 | 98 < BS <= 120 |
| 14 | 120 < BS <= 147 |
| 15 | 147 < BS <= 181 |
| 16 | 181 < BS <= 223 |
| 17 | 223 < BS <= 274 |
| 18 | 274 < BS <= 337 |
| 19 | 337 < BS <= 414 |
| 20 | 414 < BS <= 509 |
| 21 | 509 < BS <= 625 |
| 22 | 625 < BS <= 769 |
| 23 | 769 < BS <= 945 |
| 24 | 945 < BS <= 1162 |
| 25 | 1162 < BS <= 1429 |
| 26 | 1429 < BS <= 1757 |
| 27 | 1757 < BS <= 2161 |
| 28 | 2161 < BS <= 2657 |
| 29 | 2657 < BS <= 3267 |

TABLE 3-continued

| Index | Buffer Size (BS) value [bytes] |
|---|---|
| 30 | 3267 < BS <= 4017 |
| 31 | 4017 < BS <= 4940 |
| 32 | 4940 < BS <= 6074 |
| 33 | 6074 < BS <= 7469 |
| 34 | 7469 < BS <= 9185 |
| 35 | 9185 < BS <= 11294 |
| 36 | 11294 < BS <= 13888 |
| 37 | 13888 < BS <= 17077 |
| 38 | 17077 < BS <= 20999 |
| 39 | 20999 < BS <= 25822 |
| 40 | 25822 < BS <= 31752 |
| 41 | 31752 < BS <= 39045 |
| 42 | 39045 < BS <= 48012 |
| 43 | 48012 < BS <= 59039 |
| 44 | 59039 < BS <= 72598 |
| 45 | 72598 < BS <= 89272 |
| 46 | 89272 < BS <= 109774 |
| 47 | 109774 < BS <= 134986 |
| 48 | 134986 < BS <= 165989 |
| 49 | 165989 < BS <= 204111 |
| 50 | 204111 < BS <= 250990 |
| 51 | 250990 < BS <= 308634 |
| 52 | 308634 < BS <= 379519 |
| 53 | 379519 < BS <= 466683 |
| 54 | 466683 < BS <= 573866 |
| 55 | 573866 < BS <= 705666 |
| 56 | 705666 < BS <= 867737 |
| 57 | 867737 < BS <= 1067031 |
| 58 | 1067031 < BS <= 1312097 |
| 59 | 1312097 < BS <= 1613447 |
| 60 | 1613447 < BS <= 1984009 |
| 61 | 1984009 < BS <= 2439678 |
| 62 | 2439678 < BS <= 3000000 |
| 63 | BS > 3000000 |

At step 1935, the UE determines BS of MCG LCG in which transmittable data exists with reference to the extended buffer size levels in Table 3. At step 1940, the UE determines BSs of MCG LCGs in which transmittable data exists with reference to the normal buffer size levels in Table 2.

The amount of transmittable data of a certain MCG LCG corresponds to a value that is obtained by summing the amount of transmittable RLC data of the corresponding MCG LCG and the amount of transmittable PDCP data. The amount of transmittable RLC data of a certain MCG LCG includes the amount of transmittable data of RLC of LCH that belongs to the corresponding LCG. The amount of transmittable PDCP data of a certain MCG LCG corresponds to the amount of transmittable PDCP data stored in PDCP related to LCH that belongs to the MCG LCG among single-LCH-MCG-RB, and the amount of transmittable PDCP data stored in PDCP related to LCH that belongs to the MCG LCG among multi-LCH-MCG-RB.

The amount of transmittable data of a certain SCG LCG corresponds to a value that is obtained by summing the amount of transmittable RLC data of the corresponding SCG LCG and the amount of transmittable PDCP data. The amount of transmittable RLC data of a certain SCG LCG includes the amount of transmittable data of RLC of LCH that belongs to the corresponding LCG. The amount of transmittable PDCP data of a certain SCG LCG corresponds to the amount of transmittable PDCP data stored in PDCP related to LCH that belongs to the SCG LCG among single-LCH-SCG-RB, and the amount of transmittable PDCP data stored in PDCP related to LCH that belongs to the SCG LCG among multi-LCH-SCG-RB.

At step 1945, the UE generates a long BSR or a short BSR in which BS of the MCG LCG is accommodated, and transmits the BSR through a serving cell of MCG.

At step 1950, the UE checks whether the transmittable data exists in at least two SCG LCGs. The transmittable data of a certain SCG LCG includes the transmittable data stored in the RLC device of LCH that belongs to the corresponding SCG LCG and the transmittable PDCP data of the corresponding SCG LCG.

If the transmittable data exists only in one SCG LCG, the UE proceeds to step 1955 and selects a short BSR as a format of BSR If the transmittable data exists in two or more MCG LCGs, the UE proceeds to step 1960 and selects a long BSR as a format of BSR In the case where the UE simultaneously transmit BSR for MCG and BSR for SCG, the BSR for MCG and the BSR for SCG may have different formats.

At step 1965, the UE checks whether extended BSR-Sizes are setup in BSR configuration with respect to SCG (or MeNB, or a MAC device that connects MCG serving cells and MCG LCH). If extended BSR-Sizes are set up, the UE proceeds to step 1970, whereas if extended BSR-Sizes are not set up, the UE proceeds to step 19475.

At step 1970, the UE determines BS of SCG LCG in which the transmittable data exists with reference to the extended buffer size levels in Table 3. At step 1975, the UE determines BS of SCG LCG in which the transmittable data exists with reference to the normal buffer size levels in Table 2.

At step 1980, the UE generates a long BSR or a short BSR in which BS of the SCG LCG is accommodated, transmits the BSR through the serving cell of the SCG, and terminates the process.

Figure 9:
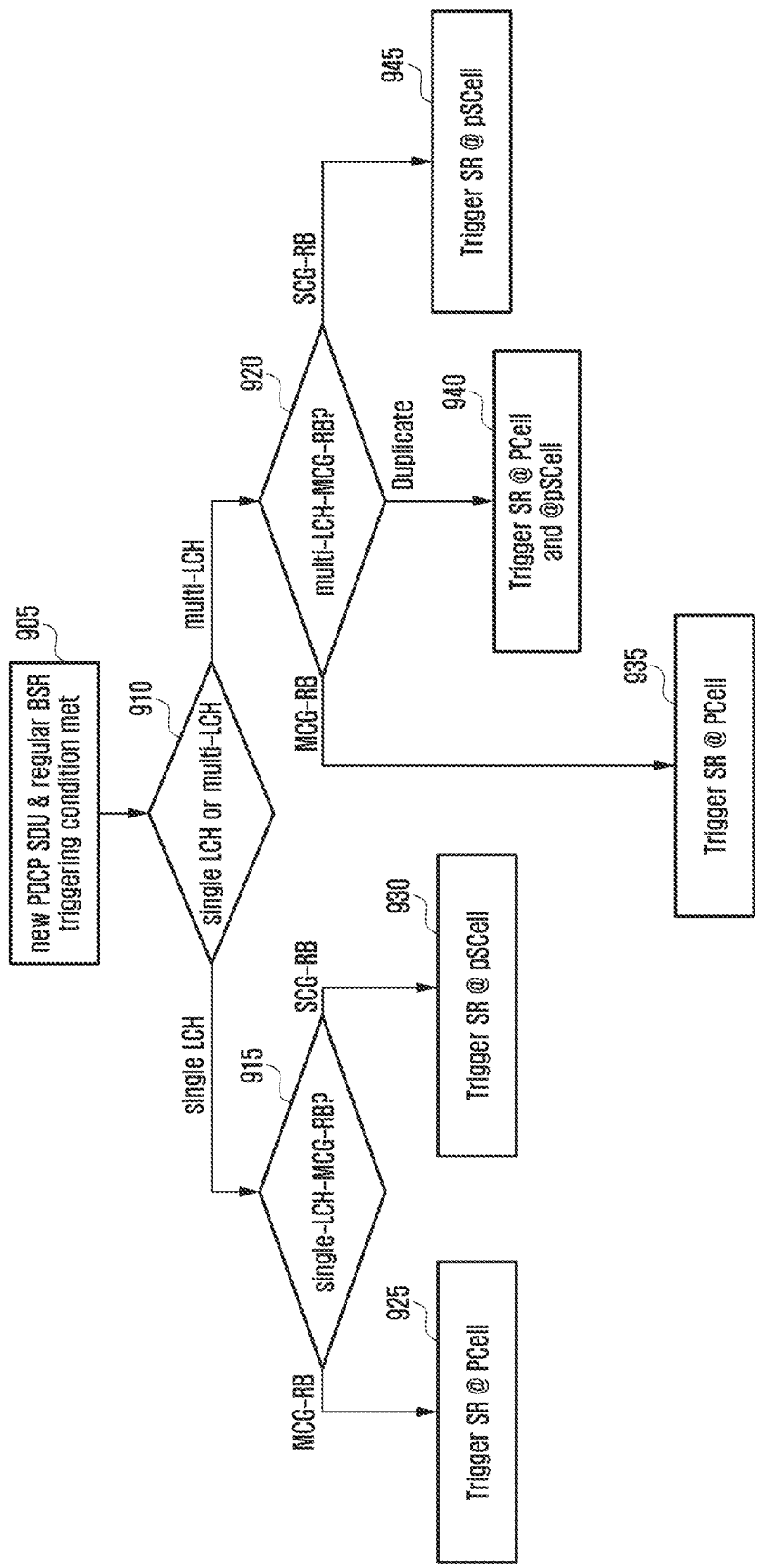
FIG. 9 is a diagram explaining the operation of UE that performs scheduling request when PDCP data is generated.

FIG. 9 is a diagram explaining the operation of UE that performs scheduling request when PDCP data is generated. Specifically, FIG. 9 shows the operation of the UE that decides a serving cell to trigger a Scheduling Request (SR).

The Scheduling Request (SR) is a signal that the UE transmits to the ENB to request a transmission resource to transmit BSR if the regular BSR is triggered. The SR may be transmitted through a transmission resource exclusively allocated to the UE. The transmission resource is configured in PUCCH, and the SR that is transmitted through the PUCCH is also called a Dedicate-Scheduling Request (D-SR). If the D-SR is not allocated to the UE, the UE request transmission resource allocation from the ENB through a random access process, and this is called a Random Access-Scheduling Request (RA-SR).

At step 905, new data is generated in a certain PDCP device, and regular BSR is triggered by the new data.

At step 910, the UE checks whether one LCH or two or more LCHs are configured in RB of the PDCP device. If one LCH is configured (i.e., single-LCH-RB), the UE proceeds to step 915, whereas if two or more LCHs are configured (i.e., multi-LCH-RB), the UE proceeds to step 920.

At step 915, the UE checks whether the new data is data that is generated by PDCP of MCG-RB or data that is generated by PDCP of SCG-RB. If the data is generated by MCG-RB, the UE proceeds to step 925 and triggers SR in PCell. That is, if SR resource is allocated to PUCCH of PCell, the UE transmits D-SR using the SR resource, whereas if the SR resource is not allocated to PUCCH of PCell, the UE performs random access in PCell.

If the data is generated by SCG-RB, the UE proceeds to step 930 and triggers SR in a specific SCell. The specific SCell is a SCell specified by the ENB among SCells that belong to SCG, and for convenience in explanation, is named primary SCell (pSCell). The UE transmits HARQ feedback for SCG cells and Channel Status Information (CSI) for the SCG cells using the PUCCH transmission resource of pSCell. The PUCCH and CSI follow those defined in the standards 36.213. The SR transmission resource of the UE may be allocated to the PUCCH of pSCell. If the SR transmission resource is allocated to the PUCCH of pSCell, the UE transmits D-SR using the SR transmission resource, whereas if the SR transmission resource is not allocated, the UE performs random access in pSCell.

At step 920, the UE checks whether the new data is data that is generated by PDCP of MCG-RB, data that is generated by PDCP of SCG-RB, or data that is generated by PDCP of duplicate-RB. If the new data is data that is generated by PDCP of MCG-RB, the UE proceeds to step 935 and triggers SR in PCell, whereas if the new data is data that is generated by PDCP of SCG-RB, the UE proceeds to step 945 and triggers SR in pSCell. If the new data is data that is generated by PDCP of duplicate-RB, the UE proceeds to step 940, and triggers SR in both PCell and pSCell.

In the case where one logical channel is set in one RB, the RLC performs sequence rearrangement operation, and it is not necessary to perform a separate sequence rearrangement operation in PDCP.

In the case where two logical channels are set in one RB, the RLC performs sequence rearrangement operation. However, since sequence rearrangement is not performed between the RLC devices, the PDCP should perform a separate sequence rearrangement.

Figure 10:
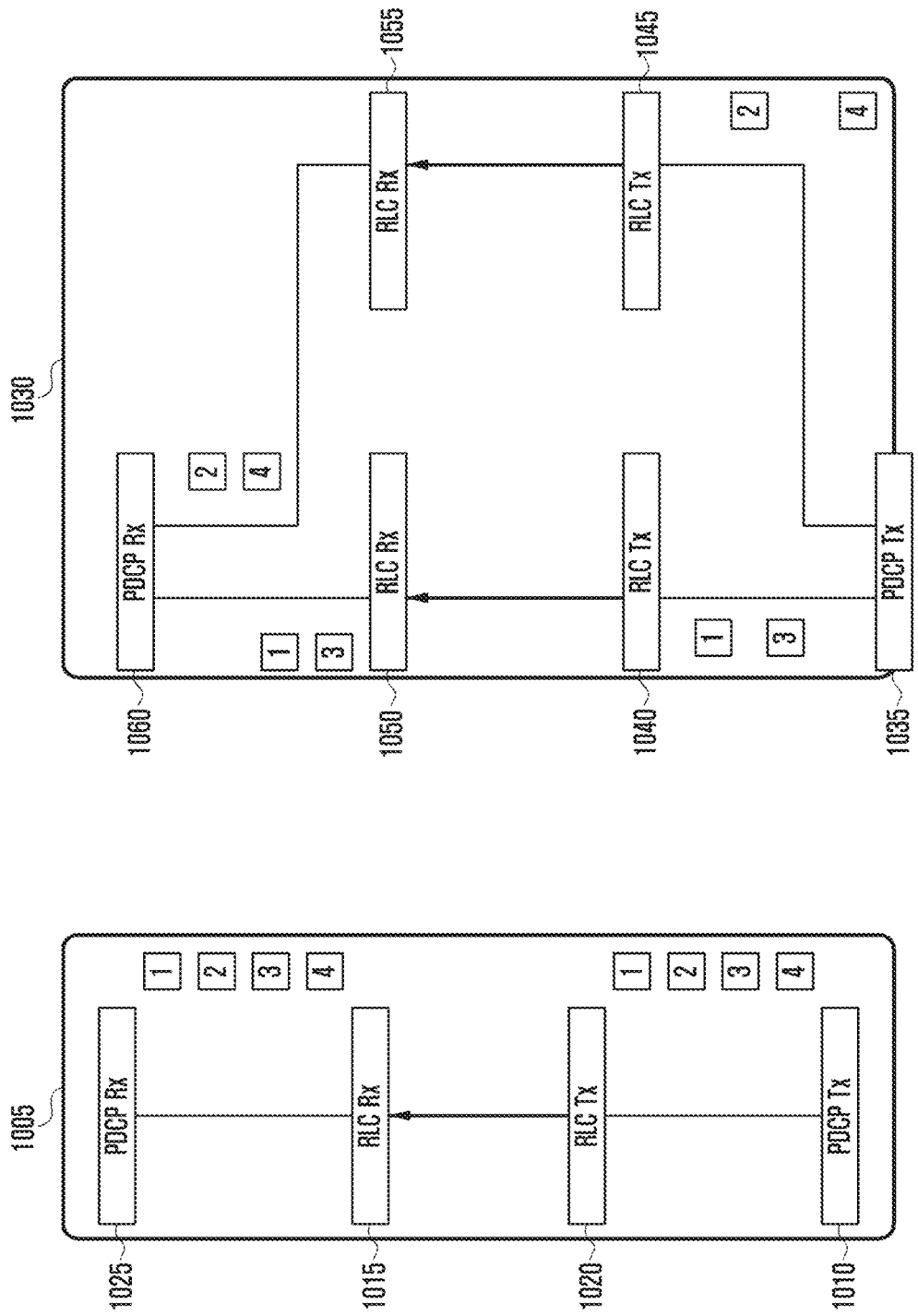
FIG. 10 is a diagram explaining a situation in which data arrives at a PDCP device of a multi-LCH bearer.

For example, as illustrated in FIG. 10, in RB 1005 in which one logical channel is configured, a PDCP transmitting device 1010 transfers packets to the RLC transmission device 1015 in sequence of packet [1], packet [2], packet [3], and packet [4]. The packets are received in an RLC receiving device 1020 through a MAC device and a radio channel. In this case, if an error occurs in the radio channel, retransmission/error recovery is performed through HARQ and ARQ, and in this process, the sequence of packets that are received by the RLC receiving device may differ from the sequence of packets that are transmitted by a PDCP transmitting device 1015. The RLC receiving device 1020 rearranges the mismatched order, and then transfers the rearranged order to the PDCP receiving device 1025. For example, the RLC receiving device 1020 transfers the packets to the PDCP receiving device 1025 in sequence of packet [1], packet [2], packet [3], and packet [4].

In the case of RB 1030 in which two logical channels are configured, the PDCP transmitting device 1035 transfers packets to two RLC transmitting devices 1040 and 1045. For example, the PDCP transmitting device 1035 transfers packet [1] and packet [3] to the first RLC transmitting device 1040, and transfers packet [2] and packet [4] to the second RLC transmitting device 1045. The first RLC transmitting device 1040 transmits packets to the first RLC receiving device 1050, and the second RLC transmitting device 1045 transmits packets to the second RLC receiving device 1055. The first RLC receiving device 1050 rearranges the received packets in sequence of the packets transferred from the PDCP transmitting device 1035. That is, the first RLC receiving device 1050 transfers the packets to the PDCP receiving device 1060 in sequence of packet [1] and packet [2]. In the same manner, the second RLC receiving device 1055 rearranges the received packets in sequence of the packets that are transferred from the PDCP transmitting device 1035. That is, the second RLC transmitting device 1045 transfers the packets to the PDCP receiving device 1060 in sequence of packet [2] and packet [4]. However, the sequence of the packets that are transferred by the first RLC receiving device 1050 and the second RLC receiving device 1055 is not arranged. For example, the packets that are transferred by the first RLC receiving device 1050 and the second RLC receiving device 1055 may be transferred in sequence of packet [1], packet [2], packet [4], and packet [3], or in sequence of packet [2], packet [4], packet [1], and packet [3], Accordingly, the PDCP receiving device 1060 is required to arrange the sequence of the packets that are transferred by two or more RLC receiving devices 1040 and 1045 once again.

The present invention proposes a method using a timer and a method using variables as the sequence rearrangement method of the PDCP receiving device. First, a method using a timer will be described.

[Method in which a PDCP Receiving Device Rearranges the Sequence Using a Timer]

The PDCP receiving device is provided with a specific timer, and the timer is driven when non-arranged packets are generated. If the sequence arrangement is not performed until the timer expires, it is considered that the sequence of the non-arranged packets has been arranged, and the corresponding packets are transferred to an upper layer.

Figure 11:
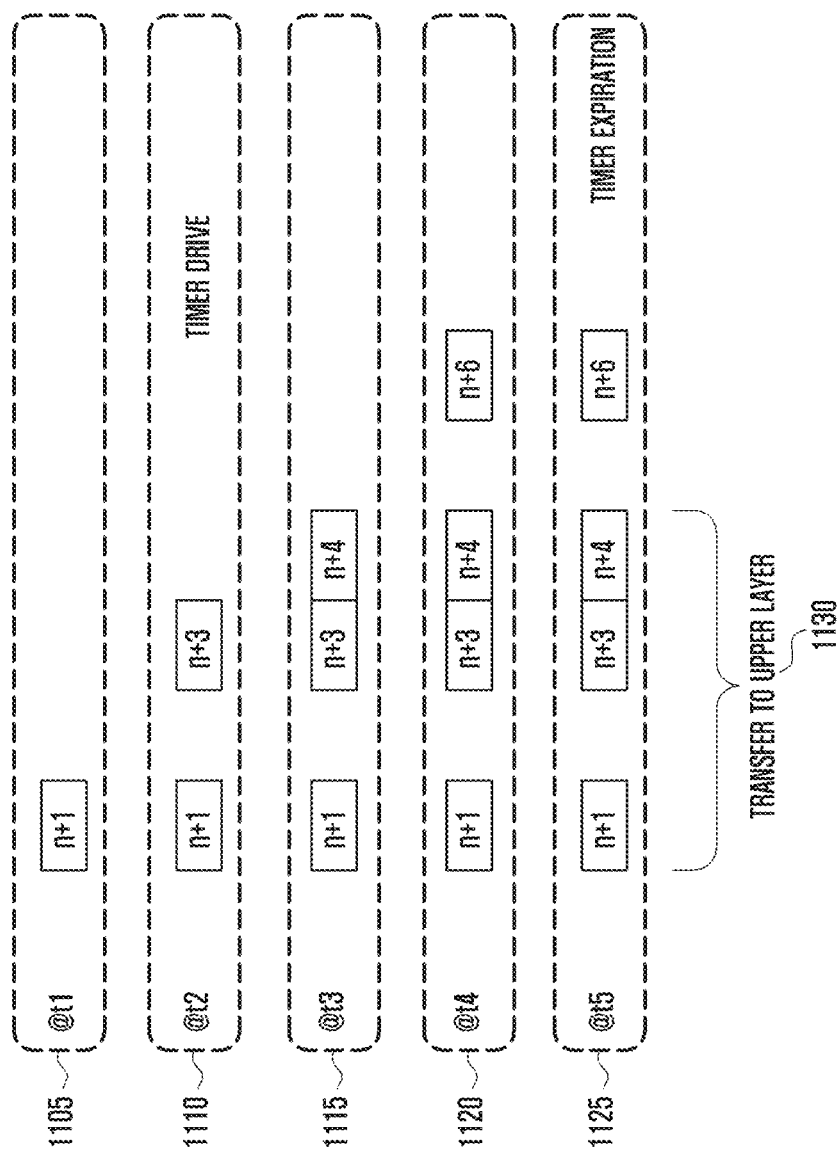
FIG. 11 is a diagram illustrating an example of a sequence rearrangement operation of a PDCP device of a multi-LCH bearer.

FIG. 11 illustrates an example of the sequence rearrangement operation.

At a certain time t1 1105, packet [n+1] arrives at the PDCP receiving device, and at time t2 1110, packet [n+3] arrives. Since the packet [n+3] is a non-arranged packet, the PDCP receiving device drives the timer after making the timer associated with the packet [n+3]. At time t3 1115, packet [n+4] is received, and at time t4 1120, packet [n+6] is received. At time t5 1125, the timer expires.

The PDCP receiving device identifies a serial number that is associated with the expired timer, that is, packet [n+1] that is a packet having a serial number that is smaller than [n+3], and [n+4] that is a successive serial number (i.e., that is smaller than the serial number of a next non-received packet) among serial numbers that are larger than [n+3] that is a serial number associated with the expired timer, and transfers packets having serial numbers which are smaller than [n+4] and include [n+4] to the upper layer.

It is preferable that a considerably long time that includes all ARQ delay and HARQ delay of a lower layer is set in the timer, and the ENB instructs the set time of the timer to the UE.

Hereinafter, a method for rearranging the sequence using variables will be described.

[Method in which a PDCP Receiving Device Rearranges the Sequence Using Variables]

As described above, RLC receiving devices independently rearrange the sequence of packets and transfer the rearranged packets to the PDCP receiving device. In other words, if RLC receiving device 1 has transferred packet [n], the PDCP receiving device can know that any packet having a serial number that is smaller than [n] will not be transferred from the RLC receiving device 1. In the same manner, if RLC receiving device 2 has transferred packet [m], the PDCP receiving device can know that any packet having a serial number that is smaller than [m] will not be transferred from the RLC receiving device 2. Using this phenomenon, simple and efficient sequential rearrangement operation can be defined.

If it is assumed that the largest serial number (or the number obtained by adding 1 thereto) of the packet received in the RLC receiving device 1 is Next_COUNT_1, and the largest serial number (or the number obtained by adding 1 thereto) of the packet received in the RLC receiving device 2 is Next_COUNT_2, the PDCP receiving device considers that, based on the smaller one of the two serial numbers, the packets having serial numbers that are smaller than the number have been arranged even if non-received packets exist, and transfers the packets to an upper layer.

Figure 12:
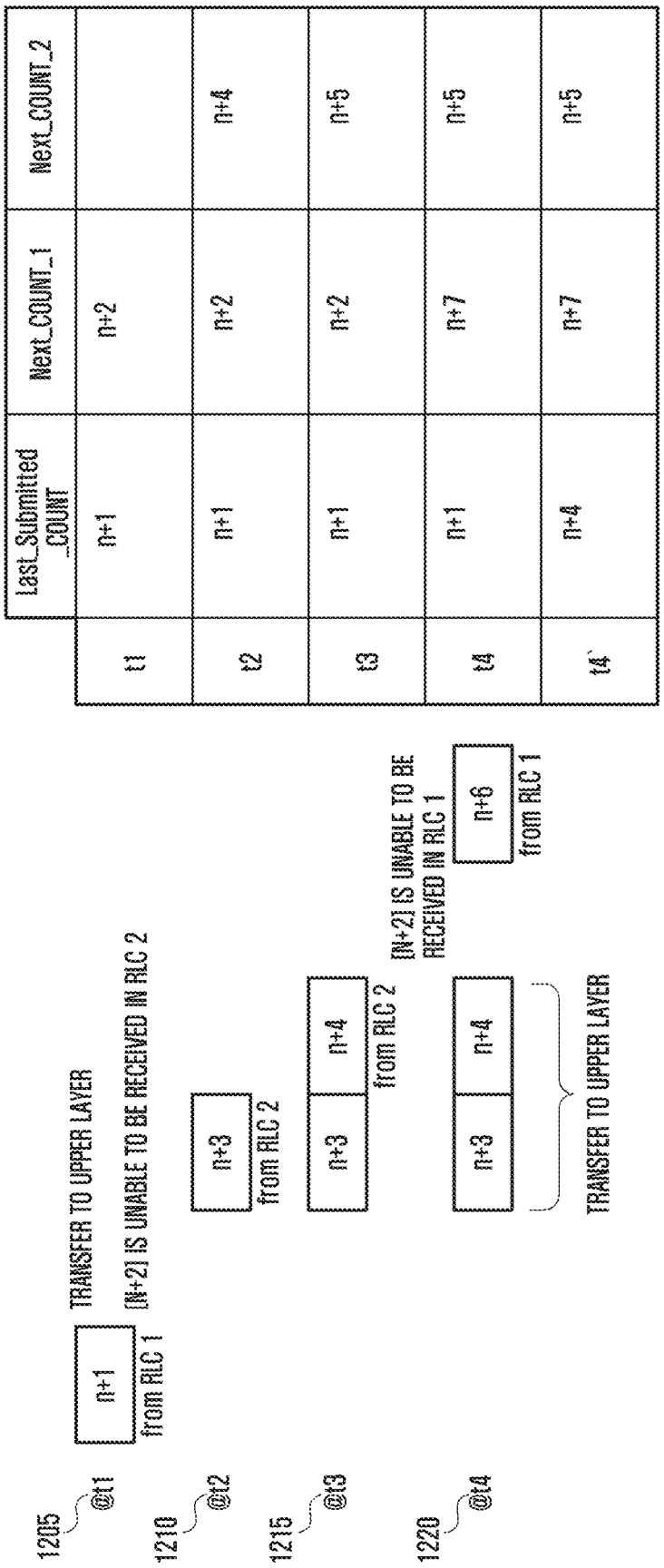
FIG. 12 is a diagram illustrating another example of a sequence rearrangement operation of a PDCP device of a multi-LCH bearer.

For example, referring to FIG. 12, at a certain time t1 1205, packet [n+1] from RLC device 1 arrives at the PDCP receiving device. If there is not a non-arranged packet (or non-received packet), a PDCP sequence rearrangement device transfers packet [n+1] to a next processing device (may be an upper layer or another functional device in the PDCP device), and set a variable Last_Submitted_COUNT to [n+1]. Since the packet [n+1] is received from the RLC device 1, the PDCP sequence rearrangement device sets Next_COUNT to [N+2]. Last_Submitted_COUNT is a variable that indicates the largest serial number of the packet of which the sequence rearrangement is completed and which is transferred to an upper layer or the next functional device. COUNT is a serial number that is used as an input value of ciphering/deciphering of the packet for security, is composed of HFN and PDCP SN, and follows the description of the standard 36.323. Next_COUNT_1 is a value obtained by adding 1 to the largest serial number of the packet received from RLC device 1. At a certain time t2 1210, packet [n+3] arrives from RLC device 2, and the PDCP receiving device set Next_COUNT_2 to [n+4]. The PDCP receiving device recognizes that packet [n+2] is a non-received packet, and a non-arranged packet is generated due to the non-received packet. Further, since the PDCP receiving device has already received the packet having a serial number that is larger than the packet [n+2] from RLC device 2, it recognizes that there is no possibility that the packet [n+2] is received from the RLC device 2. At a certain time t3 1215, packet [n+4] is received from the RLC device 2, and the PDCP receiving device sets Next_COUNT_2 to [n+5]. At a certain time t4 1240, packet [n+6] is received from the RLC device 1, and the PDCP device sets Next_COUNT_1 to [n+7]. Since the packet having a serial number that is larger than [n+2] is received from the RLC device 1, the PDCP receiving device recognizes that there is no possibility that the packet [n+2] is received even from the RLC device 1, disregards the packet [n+2] or operates as if the packet [n+2] has been received. That is, if the packet [n+2] is received, the PDCP receiving device transfers the remaining packets of which the sequence has been arranged, for example, transfers packet [n+3] and packet [n+4] to the next functional device, and changes Last_Submitted_COUNT to [n+4]. In other words, the UE determines a smaller value (in the above example, [n+5]) of Next_COUNT_1 and Next_COUNT_2, and transfers all the packets having the serial numbers that are smaller than Next_COUNT to the next processing device. The fact that the serial number of a certain non-received packet is smaller than Next_COUNT_1 means that there is no possibility that the packet is received from the RLC device 1, and the fact that the serial number of a certain non-received packet is smaller than Next_COUNT_2 means that there is no possibility that the packet is received from the RLC device 2. Accordingly, if the serial number of a certain non-received packet is smaller than Next_COUNT_1 and is also smaller than Next_COUNT_2, it is instructed that the non-received packet will not be received any further, and the sequence rearrangement operation is performed to meet this condition.

The above-described operation may be defined as follows.
The PDCP receiving device records the largest serial number of the packets received from the RLC device 1 in Next_COUNT_1

The PDCP receiving device records the largest serial number of the packets received from the RLC device 2 in Next_COUNT_2

The PDCP receiving device transfers all packets having serial numbers that are smaller than the minimum value of Next_COUNT_1 and Next_COUNT_2 to a next functional device.

Figure 13:
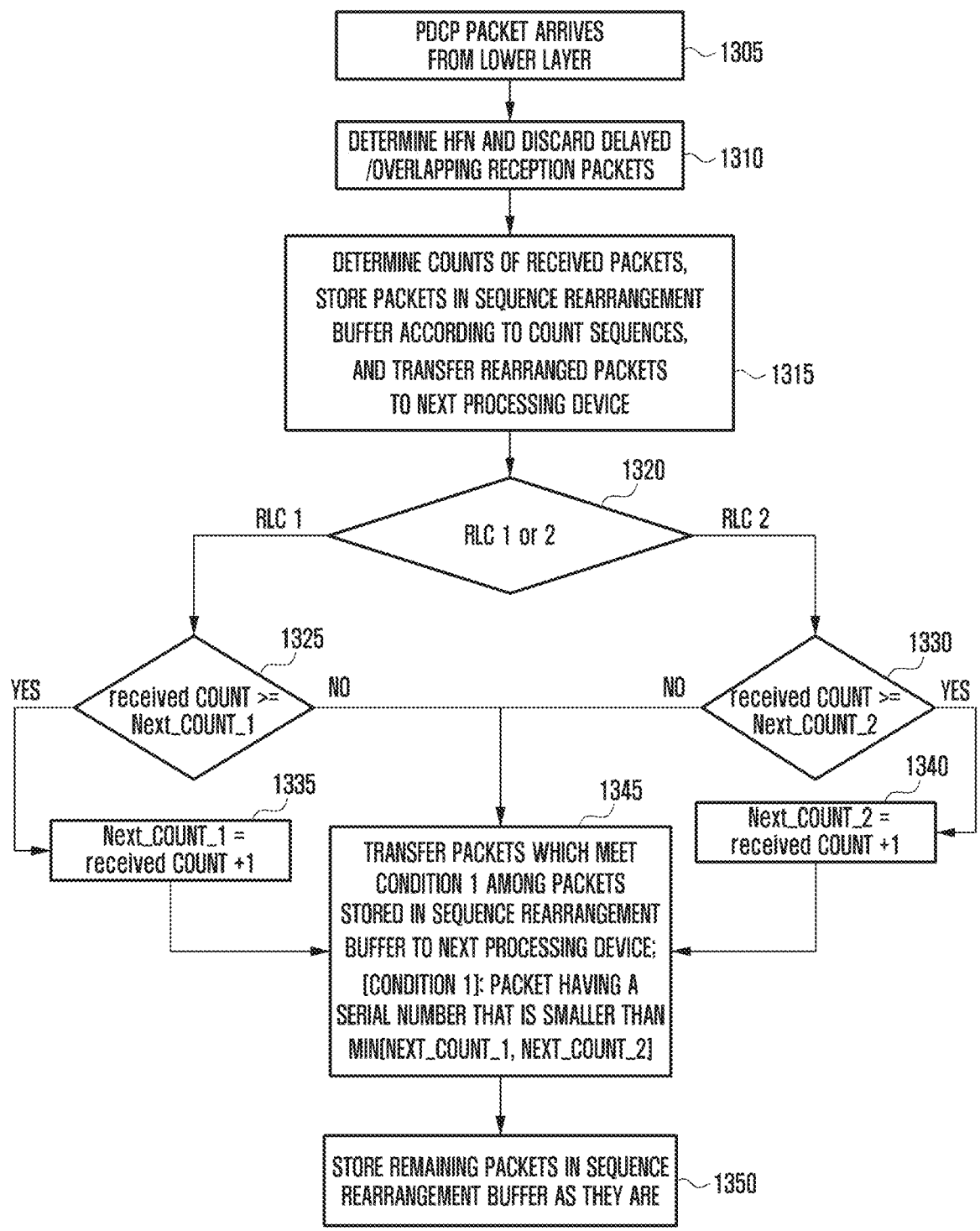
FIG. 13 is a diagram illustrating the operation of a PDCP device of a multi-LCH bearer that processes a PDCP packet.

FIG. 13 is a diagram illustrating the operation of a PDCP device of a multi-LCH bearer that processes a PDCP packet. FIG. 13 shows a method for rearranging the sequence using variables through a PDCP receiving device that constitutes a PDCP device.

At step 1305, if a PDCP packet arrives from a lower layer (RLC device), the PDCP receiving device proceeds to step 1310, decides Hyper Frame Number (HFN) of the received packet, and discards a packet received in delay. The Hyper Frame Number (HFN) is an upper bit of COUNT, and HFN and PCDP SN are combined to form COUNT. The PDCP SN is explicitly indicated at a PDCP packet header, but HFN is not explicitly indicated. Accordingly, the PDCP transmitting device should self-determine the HFN of the received packet. In transmitting the packets, if the PDCP transmitting device makes a specific condition be satisfied (transmits the packet so that the sequence mismatch of PDCP SN becomes smaller than a half of the total sum of the serial numbers that can be instructed by the PDCP SN), the PDCP receiving device determines the HFN using the serial number of the PDCP packet that is most recently received (received PDCP SN, see the standard 36.323), the largest serial number received up to now (Next_PDCP_RX_SN, see the standard 36.323), and a window having a predetermined size (Reordering_Window, see the standard 36.323). Further, if a packet having a serial number that is larger than that of the received packet has already been transferred to an upper layer (i.e., if the received packet has already been received or is a delayed packet), the PDCP receiving device performs header decompression with respect to the received packet, and then discards the packet. More specifically, when a packet is received in overlap or in delay due to an unspecified reason, the packet may contain available information for updating header decompression context, and thus the packet is discarded after the header decomposition is performed. The above-described process follows the description of Section 5.1.2.1.2 of the standard 36.323. According to the standard, if the following condition is satisfied, it means that the received packet is received in delay or in ovelap.

IF received PDCP SN-Last_Submitted_PDCP_RX_SN>Reordering_Window or 0<=Last_Submitted_PDCP_RX_SN-received PDCP SN<Reordering_Window:

If the HFN of the received packet is determined and the packet is not received in delay or in overlap, the PDCP receiving device proceeds to step 1315, determines COUNT of the received packet through combining of the HFN and PDCP SN, and stores the packet in a sequence rearrangement buffer according to the sequence of COUNT. Further, if the received packet is a packet of which the sequence rearrangement is not required, that is, if the received COUNT is equal to a value obtained by adding 1 to last_submitted_COUNT (or if the received PDCP SN is equal to a value obtained by adding 1 to last_submitted_PDCP_RX_SN), the PDCP receiving device transfers the received PDCP packet to the next processing device. If a packet is stored in the sequence rearrangement buffer (i.e., a packet that requires sequence rearrangement still exists), the PDCP receiving device proceeds to step 1320. If a packet that requires the sequence rearrangement does not exist, the PDCP receiving device waits for until the next PDCP packet arrives.

At step 1320, the PDCP receiving device determines whether the packet is received from the RLC device 1 or the RLC device 2. Further, the PDCP receiving device determines whether the packet is received from the first logical channel or the second logical channel. The RLC device 1 or the first logical channel is an RLC device or a logical channel related to MCG, and the RLC device 2 or the second logical channel may be an RLC device or a logical channel related to SCG.

If a packet is received from the RLC device 1, the PDCP device proceeds to step 1325, whereas if a packet is received from the RLC device 2, the PDCP device proceeds to step 1330.

At step 1325, the PDCP device checks whether COUNT (received COUNT) of the received packet is equal to or larger than Next_COUNT_1. If COUNT (received COUNT) of the received packet is equal to or larger than Next_COUNT_1, the PDCP device proceeds to step 1335, updates Next_COUNT_1 to a value obtained by adding 1 to received COUNT, and proceeds to step 1345. If COUNT of the received packet is smaller than Next_COUNT_1, the PDCP device immediately proceeds to step 1345.

At step 1330, the PDCP device checks whether COUNT (received COUNT) of the received packet is equal to or larger than Next_COUNT_2. If COUNT (received COUNT) of the received packet is equal to or larger than Next_COUNT_2, the PDCP device proceeds to step 1340, updates Next_COUNT_2 to a value obtained by adding 1 to received COUNT, and proceeds to step 1345. If COUNT of the received packet is smaller than Next_COUNT_2, the PDCP device immediately proceeds to step 1345.

At step 1345, the PDCP device transfers packets that satisfy condition 1 among packets stored in the PDCP sequence rearrangement buffer to the next processing device. The packet that satisfies condition 1 may mean, for example, a packet of which COUNT is smaller than Min [Next_COUNT_1, Next_COUNT_2].

At step 1350, the PDCP device stores the remaining packets that do not satisfy condition 1 in the sequence rearrangement buffer as they are, and waits for unit the next PDCP packet arrives from a lower layer.

Figure 14:
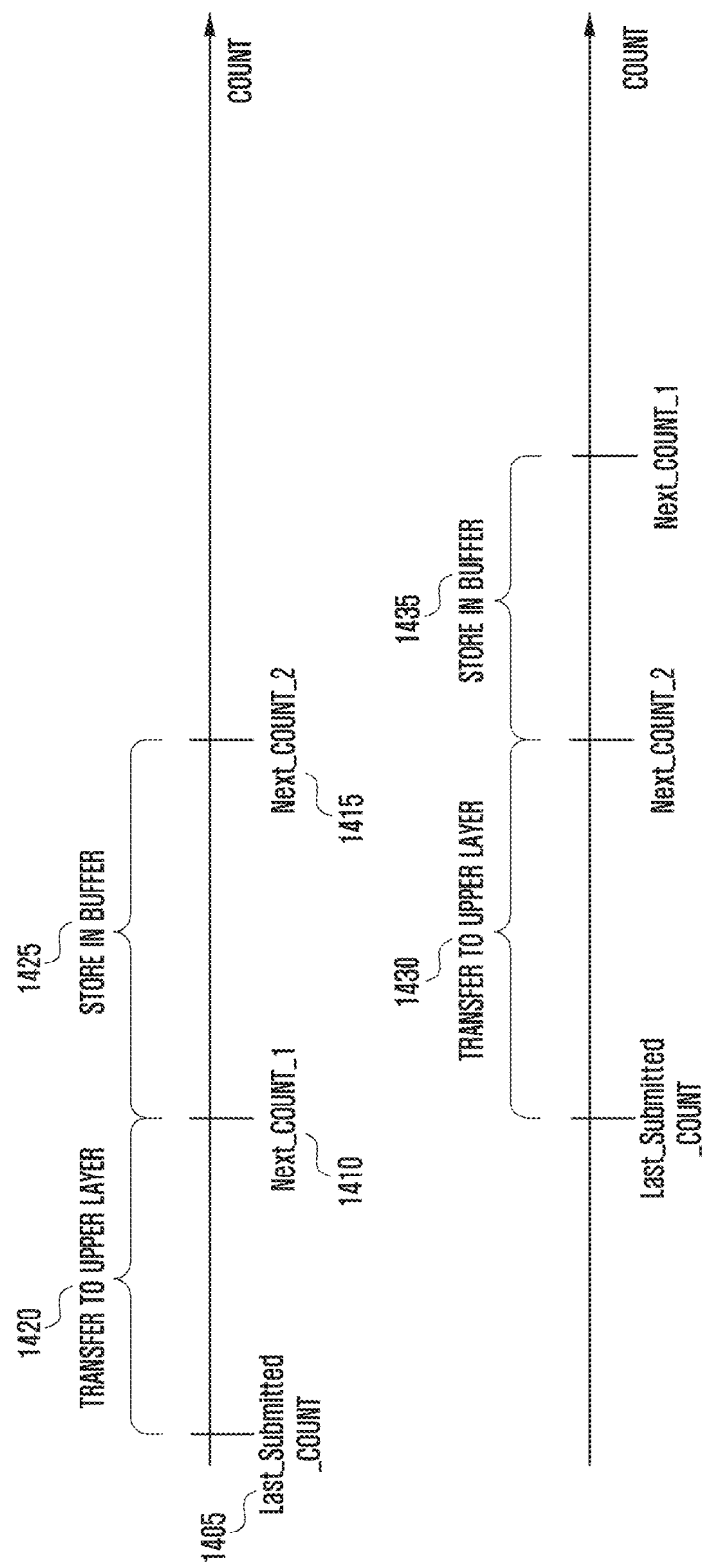
FIG. 14 is a diagram explaining a sequence rearrangement operation of a PDCP device.

Referring to FIG. 14, a method in which a PDCP receiving device rearranges the sequence using variable will be described as follows.

If the largest COUNT (Net_COUNT_2 1415) received from RLC device 2 is larger than the largest COUNT (Next_COUNT_1 1410 received from an RLC device 1 at a certain time, the PDCP receiving device stores packets 1425 between Next_COUNT_1 and Next_COUNT_2 in the sequence rearrangement buffer. Further, the PDCP receiving device transfers packets 1420 between Next_COUNT_1 and Last_Submitted_COUNT 1405 to an upper layer (or a next functional device).

Thereafter, if packets are received from the RLC device and Next_COUNT_1 becomes larger than Next_COUNT_2, the PDCP receiving device transfers packets 1430 between Next_COUNT_1 and Last_Submitted_COUNT to an upper layer (or a next functional device), and stores packets 1435 between Next_COUNT_2 and Next_COUNT_1 in the sequence rearrangement buffer.

Figure 15:
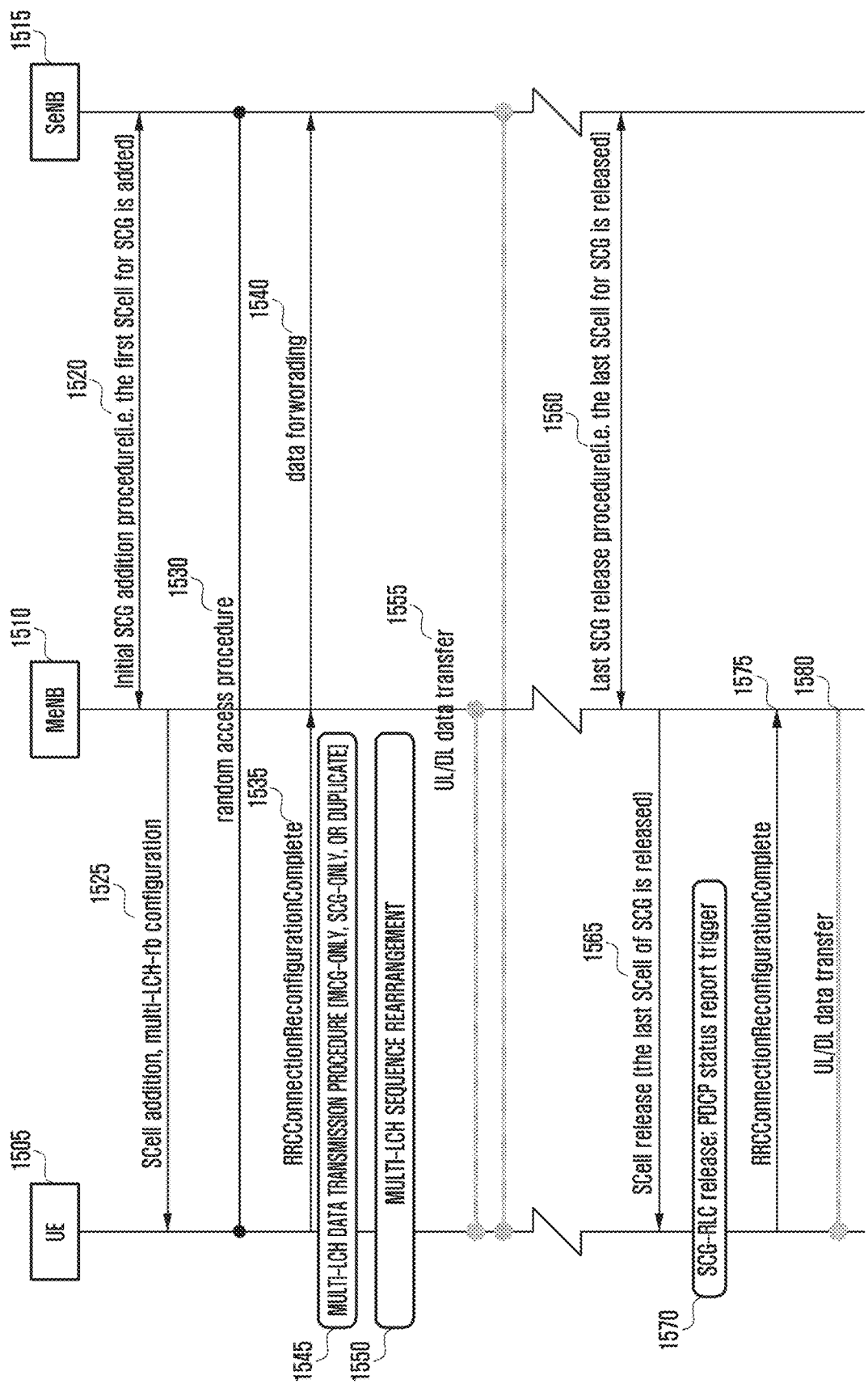
FIG. 15 is a diagram explaining the whole operation of configuring and releasing a multi-RLC bearer.

FIG. 15 is a diagram explaining the whole operation related to generation and release of multi-LCH-RB.

In a mobile communication system composed of UE 1505, MeNB 1510, and SeNB 1515, at a certain time, MeNB 1510 determines to add a serving cell of SeNB 1515 to the UE 1505, and performs a procedure for serving cell addition with the SeNB 1515 (1520). In particular, if SCell of the SeNB 1515 is firstly configured to the UE 1505 (i.e., if the first SCG SCell is configured), the MeNB 1510 and the SeNB 1515 determine which RB is serviced by the MeNB 1510 and which RB is serviced by SeNB 1515. The MeNB 1510 and the SeNB 1515 may configure multi-LCH-RB as a downlink and configure multi-LCH-MCG-RB or multi-LCH-SCG-RB as an uplink with respect to RB that meets the specific condition, for example, with respect to RB that requires high-speed data transmission to the downlink.

The MeNB 1510 transmit a predetermined RRC control message to the UE 1505 (1525). In the RRC control message, SCell configuration information and multi-LCH-rb configuration information are accommodated. The SCell configuration information is related to SCell that is newly added, and also includes even information that indicates whether the SCell is MCGS Cell or SCG SCell. The multi-LCH-rb configuration information is information about a radio bearer in which multi-LCH is configured, and is composed of lower information as below. The multi-LCH-rb information may be included in the RRC control message that includes configuration information of the first SCG SCell.

This is described in Table 4 below.

TABLE 4

| | |
|---|---|
| bearer identifier | Bearer identifier in which multi-LCH is configured, SCG-LCH and RLC2 configured by below information in bearer of the identifier among bearers already configured in UE are additionally connected and mapped. |
| pdcp-Config | Configuration information that is included only when it is required to update PDCP configuration information of existing bearer in which multi-LCH is configured. If this configuration information is not included, existing pdcp-Config is used as it is. |
| uplink mode | This instructs one value of MCG-only, SCG-only, and duplicate. In the case of MCG-only, uplink PDCP packet is transmitted only through RLC device 1 (or only through MCG-LCH). In the case of SCG-only, uplink PDCP packet is transmitted only through RLC device 2 (or only through SCG-LCH). Even if certain bearer is configured by SCG-only, packet that has been already transmitted through RLC device 1 is transmitted as it is. In the case of duplicate, upper link PDCP packet is transmitted in overlap through RLC device 1 and RLC device 2. |

TABLE 4-continued

| | |
|---|---|
| RLC-config | Configuration information of RLC (i.e., RLC device 1) with respect to MCG. RLC-config exists only in the case where existing RLC configuration of existing bearer in which multi-LCH is configured is required to be updated. If this configuration information does not exist, existing RLC-config is used as it is. |
| RLC-config2 | Configuration information of RLC (i.e., RLC device 2) connected to SCG. If being equal to RLC-config, this may not exist. UE generates new RLC device by applying RLC-config2, and connects RLC device to PDCP device of bearer instructed by bearer identifier. |
| logicalChannelIdentity2 | Logical channel identifier for RLC device 2 (or SCG-LCH) that is used to identify logical channel on MAC header. Information structure is equal to that of logicalChannelIdnetity. If logical channel identifier of MCG-LCH is used as it is, signaling is not performed. In this case, as logical channel identifier of RLC device 2, the same value as the value of logical channel identifier of RLC device 1 (or MCG-LCH) is used. |
| logicalChannelConfig2 | Configuration information about SCG-LCH. Information structure is equal to that of logicalChannelConfig. Through the information, logical channel priority information of SCG-LCH and LCG information are instructed. If this information is equal to logical ChannelConfig of MCG-LCH, signaling is not performed. |

If the control message is received, the UE 1505 generates SCG-RLC with respect to a bearer that is instructed by a bearer identifier to be connected to the PDCP device, and generates SCG-LCH to connect SCG-RLC to MAC. Further, with respect to the bearer configured by SCG-only, the UE 1505 triggers regular BSR for SCG and regular BSR for MCG. In the regular BSR for the SCG, only SCG-only data is reflected, and in the regular BSR for MCG, only MCG-only-data is reflected. As described above, the reason why the BSR is triggered after configuring multi-LCH is that BS is changed before and after the configuration of multi-LCH.

Thereafter, the UE 1505 performs random access in the newly added SCG SCell (1530). Through the random access process, the UE 1505 establishes uplink synchronization with the newly added SCG SCell, and configures an uplink transmission output.

The UE 1505 reports, to MeNB 1510, that a specific RRC control message is transmitted and SCell configuration and multi-lCH configuration have been completed (1535). If the above-described information is received, the MeNB 1510 forwards downlink data of a bearer in which multi-LCH is configured to SeNB 1515 (1540).

On the other hand, after transmitting the specific RRC control message, the UE 1505 starts multi-LCH operation with respect to the bearer in which multi-LCH is configured. That is, in transmitting the uplink data of the bearer in which MCG-RB is configured, the UE 1505 always transmits PDCP data of the bearer to the MCG-RLC device and MCG-LCH (1545). In transmitting the uplink data of the bearer in which SCG-RB is configured, the UE 1505 always transmits PDCP data of the bearer to the SCG-RLC device and SCG-LCH (1545). In transmitting the uplink data of the bearer in which duplicate is configured, the UE 1505 always transmits PDCP data to the SCG-RLC device and SCG-LCH, and MCG-RLC device and MCG-LCH in overlap (1545).

In receiving the downlink PDCP packet of the bearer in which multi-LCH is configured, the UE 1505 applies "sequence rearrangement using a timer" or "sequence rearrangement using variables" (1550).

The terminal 1505 performs data transmission/reception with the MeNB 1510 and SeNB 1515 (1555).

Thereafter, at a certain time, the MeNB 1510 or the SeNB 1515 determines to release the SCG SCell. The MeNB 1510 and the SeNB 1515 perform a procedure for releasing the SCG ScCell (1560), and the MeNB 1510 transmits a specific RRC control message to the UE 1505 to instruct SCT SCell release (1565).

If the control message is received, the UE 1505 releases the SCG SCell in accordance with an instruction. If the control message is to instruct release of the last SCG SCell (i.e., if the SCG SCell does not exist anymore through release of the SCG SCell in accordance with the instruction of the control message), the UE 1505 releases the SCG RLC and the SCG LCH of multi-LCH-RB even without a separate instruction (1570), and triggers a PDCP status report. In the process of releasing the SCG RLC, the UE 1505 reconfigures the downlink RLC PDUs stored in the SCG RLC to RLC SDU to transfer the RLC SDU to PDCP, and discards the uplink RLC PDUs and the uplink RLC SDUs stored in the SCG RLC. The PDCP status report may be triggered by radio bearers, and the UE 1505 checks the serial numbers of the PDCP packets stored in the PDCP receiving buffer in which the PDCP status report has been triggered, and generates a PDCP status report that includes serial number of non-received PDCP packets and related information.

The PDCP status report is control information that is used to prevent a loss of PDCP packets in handover or RRC connection reestablishment processes. The handover or RRC connection reestablishment process accompanies reestablishment of all RLC devices configured in the UE 1505 (from a standpoint of the PDCP device, reestablishment of the lower layer). If the handover or RRC connection reestablishment process starts, the UE 1505 triggers the PDCP status report with respect to all DRBs that satisfy condition 2. In contrast, if the last SCG SCell is released, the UE triggers the PDCP status report with respect to all DRBs that satisfy condition 3.

[Condition 2]

DRB in which statusReportRequired is configured among DRBs in which RLC AM is configured.

The statusReportRequired follows the description of the standards 36.331 and 36.323.

[Condition 3]

Multi-LCH-RB or single-LCH-SCG-RB among DRBs in which RLC AM and statusReportRequired are configured.

The UE 1505 reports, to the MeNB 1510, that the above-described process has been successfully completed through transmission of the specific RRC control message to the MeNB 1510 (1575), and the UE 1505 and the MeNB 1510 transmit/receive uplink data and downlink data through MCG Scell.

Figure 16:
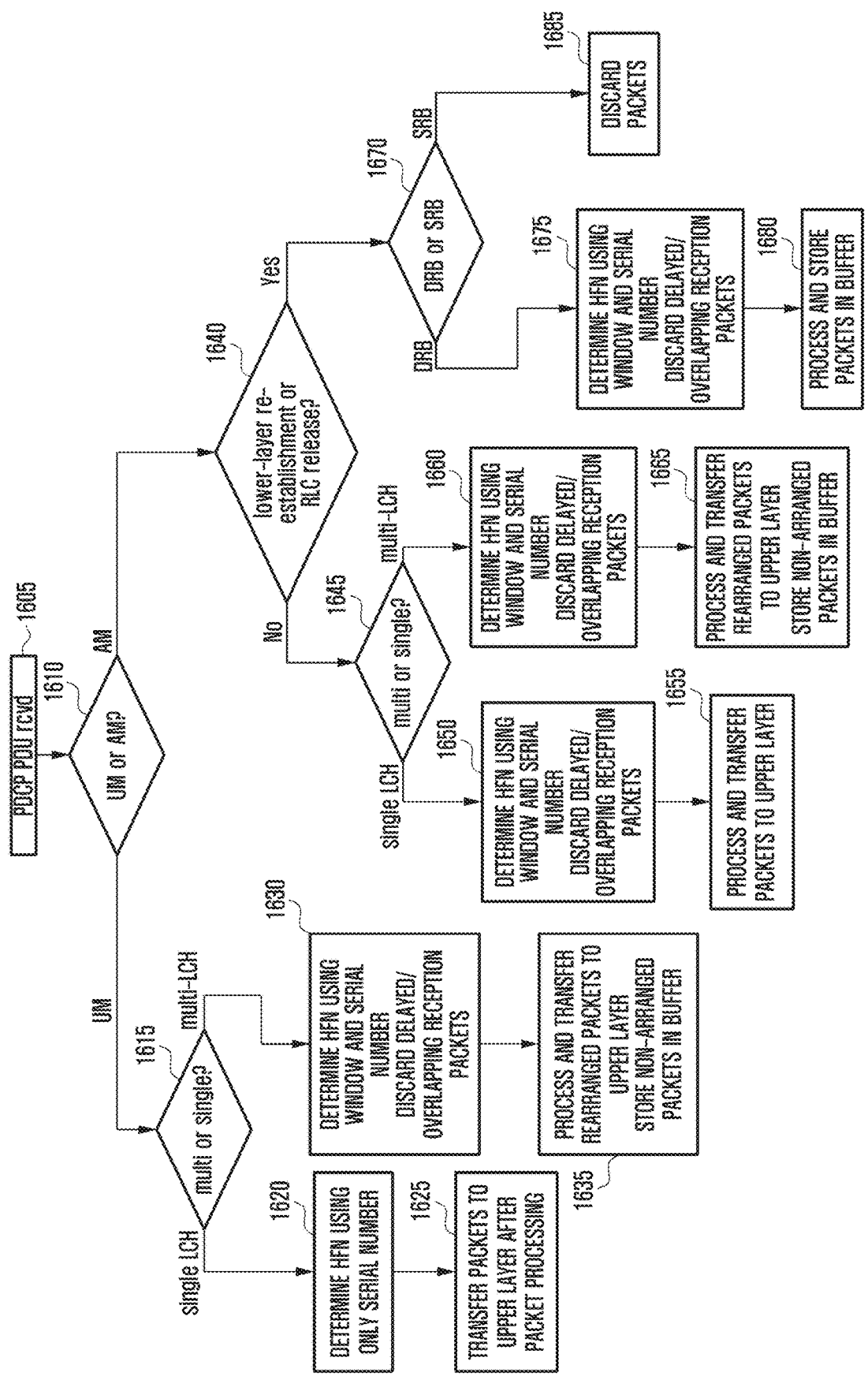
FIG. 16 is a diagram illustrating the operation of a PDCP device that processes a PDCP packet.

FIG. 16 is a diagram illustrating the operation of a PDCP device that processes a PDCP packet. FIG. 16 illustrates the operation of the UE that has received a PDCP packet in consideration of all kinds of RBs.

At step 1605, if the PDCP packet is transferred from RLC to PDCP, the UE, at step 1610, checks whether the RLC device is an RLC of Unacknowledged Mode (UM, see the standard 36.322) or an RLC of Acknowledged mode (AM, see the standard 36.322). If the RLC device is UM RLC, the UE proceeds to step 1615, whereas if the RLC device is AM RLC, the UE proceeds to step 1640.

In the case of the bearer in which the UM RLC is configured, it is more important to reduce a delay other than reducing a packet loss, and thus the UE processes the received packet and immediately transfers the processed packet to an upper layer without applying sequence rearrangement. If the bearer is a single-LCH bearer, the RLC device performs sequence arrangement, and thus sequentially arranged packets arrive at the PDCP device. In contrast, if the bearer is a multi-LCH bearer, there is a possibility that non-arranged packets are transferred. Due to such a difference, the UE performs different operations in the two cases.

At step 1615, the UE checks whether the bearer is the single-LCH bearer or the multi-LCH bearer. If the bearer is the single-LCH bearer, the UE proceeds to step 1620, whereas if the bearer is the multi-LCH bearer, the UE proceeds to step 1630.

At step 1620, the UE determines HFN through comparison of the serial number of the current packet with the serial number of the previous packet. In a word, if the serial number of the current packet is smaller than the serial number of the previous packet, it is decided that wrap around of the PDCP SN occurs, and the UE increases HFN by 1. If the serial number of the current packet is larger than the serial number of the previous packet, the current HFN is used as it is. At step 1625, the UE processes the packet using the HFN (e.g., performs packet deciphering and header decompression), and transfers the processed packet to the upper layer. At step 1630, the UE determines the HFN using the window and the serial number, and proceeds to step 1635. If the received packet is a packet received in delay/overlap, the UE discards the packet, and terminates the process. Step 1630 is the same as step 1315. At step 1635, the UE checks whether there is a non-received packet among the packets having the serial numbers that are smaller than the serial number of the received packet (or whether there is a non-received packet between the serial number of the received packet and Last_submitted_COUND or Last_submitted_SN). If such a packet does not exist, the UE processes the received packet and transfers the processed packet to the upper layer. If there is a non-received packet among the packets having the serial numbers that are smaller than the serial number of the received packet, the UE receives the packet and checks whether there are sequentially arranged packets. The UE processes the corresponding packet and transfers the processed packet to the upper layer, and stores the remaining packets in a buffer. For example, due to the received packet, Next_COUNT is updated, and if the updated Next_COUNT has a value that is smaller than the value of another Next_COUNT, it means that the sequentially arranged packets exist due to the received packet, and thus the UE determines whether the packets are sequentially arranged on the basis of the updated Next_COUNT.

At step 1640, the UE checks whether the PDCP packet is a packet that is transferred due to the reestablishment of the lower layer or the release of the lower layer. If so, the UE proceeds to step 1670, and if not, the UE proceeds to step 1645. The reestablishment of the lower layer occurs due to the handover or the like, and the release of the lower layer occurs due to the release of the last SCG SCell.

At step 1645, the UE checks whether the corresponding bearer is a multi-LCH bearer or a single-LCH bearer. If the bearer is the single-LCH bearer, the UE proceeds to step 1650, whereas if the bearer is the multi-LCH bearer, the UE proceeds to step 1660. The steps 1650 and 1660 are the same as the step 1630. The step 1665 is the same as the step 1635. At step 1655, the UE processes the received packet and transfers the processed packet to the upper layer. The fact that the UE proceeds to step 1650 and step 1655 with respect to the single-LCH bearer means that a separate sequence rearrangement process is not applied. The fact that the UE proceeds to step 1660 and step 1665 with respect to the multi-LCH bearer means that the sequence rearrangement process is applied with respect to the corresponding packet.

At step 1670, the UE checks whether the corresponding bearer is Data Radio Bearer (DRB) or Signaling Radio Bearer (SRB). If the lower layer is reestablished due to the handover or the RRC connection reestablishment or the SCG-RLC is released through the release of the last SCG SCell in the case where the bearer is the DRB, the UE temporarily store the non-arranged packets in the buffer, and if a subsequent packet arrives, the UE transfers the packets to the upper layer. In contrast, if the bearer is the signaling bearer, the event occurrence itself means that a new RRC procedure starts, and thus it is required to discard all the previous packets to prevent unnecessary confusion. If the bearer is the data bearer, the UE proceeds to step 1675. The step 1675 is the same as the step 1630. At step 1680, the UE processes the HFN-determined terminals and stores non-arranged PDCP SDUs in the buffer. After the corresponding RRC procedure is completed, the PDCP SDUs stored in the buffer are transferred to the upper layer together with the received packets. At step 1685, the UE discards the received packets.

In the case of the multi-bearer as shown at steps 1635, 1665, and 1680, prior to the processing of the PDCP PDUs that are received from a lower layer that normally operates as PDCP SDUs, other than the PDCP PDUs that are received due to the reestablishment or release of the lower layer, the UE stores the PDCP PDUs in the buffer, if the corresponding PDCP PDUs are not sequentially arranged, and waits for until the PDCP PDUs are sequentially arranged. In contrast, in the case of the single bearer, if the PDCP PDUs are received due to the reestablishment or release of the lower layer, the UE processes the received PDCP PDUs as PDCP SDUs, transfers the sequentially arranged SDUs to the upper layer, and stores the non-arranged SDUs in the buffer. In other words, in the case of the multi-bearer, the UE processes only the sequentially arranged PDUs as the SDUs, and stores the non-arranged PDUs in the buffer, and then processes as the SDUs after the non-arranged PDUs are sequentially arranged. In the case of the single bearer, the UE processes the received PDUs as SDUs, transfers the sequentially arranged PDUs to the upper layer, and stores the non-arranged SDUs in the buffer.

In the embodiments of the present invention, it is described that both the MCG serving cell and the SCG serving cell use the LTE technology. However, it is also possible that the two cell groups use different radio technologies. For example, the UE may transmit/receive data with the MCG serving cell using the LTE radio technology, and may transmit/receive data with the SCG serving cell using a different radio technology, for example, a WIFI technology or HSPA technology. In this case, it is preferable that the LTE that is a radio technology having high reliability is applied with respect to the MCG serving cell, and another radio technology is applied with respect to the SCG serving cell. According to a scenario in which the UE transmits/receives data using different radio technologies, one PDCP device performs sequence rearrangement with respect to PDCP PDUs that are received through the different radio technologies, and distributes the PDCP PDUs to lower layer devices having different radio technologies. In this case, it is possible to apply technologies proposed through the whole description of the present invention, for example, the timer-based sequence rearrangement technology or the method for transmitting PDCP PDUs only to a specific cell group (in other words, specific radio technology). According to the multi-bearer according to the present invention, one PDCP device is connected to two lower layers that use different radio technologies, and at least one of the lower layers may be defined as a bearer that is a lower layer using the LTE technology.

Figure 17:
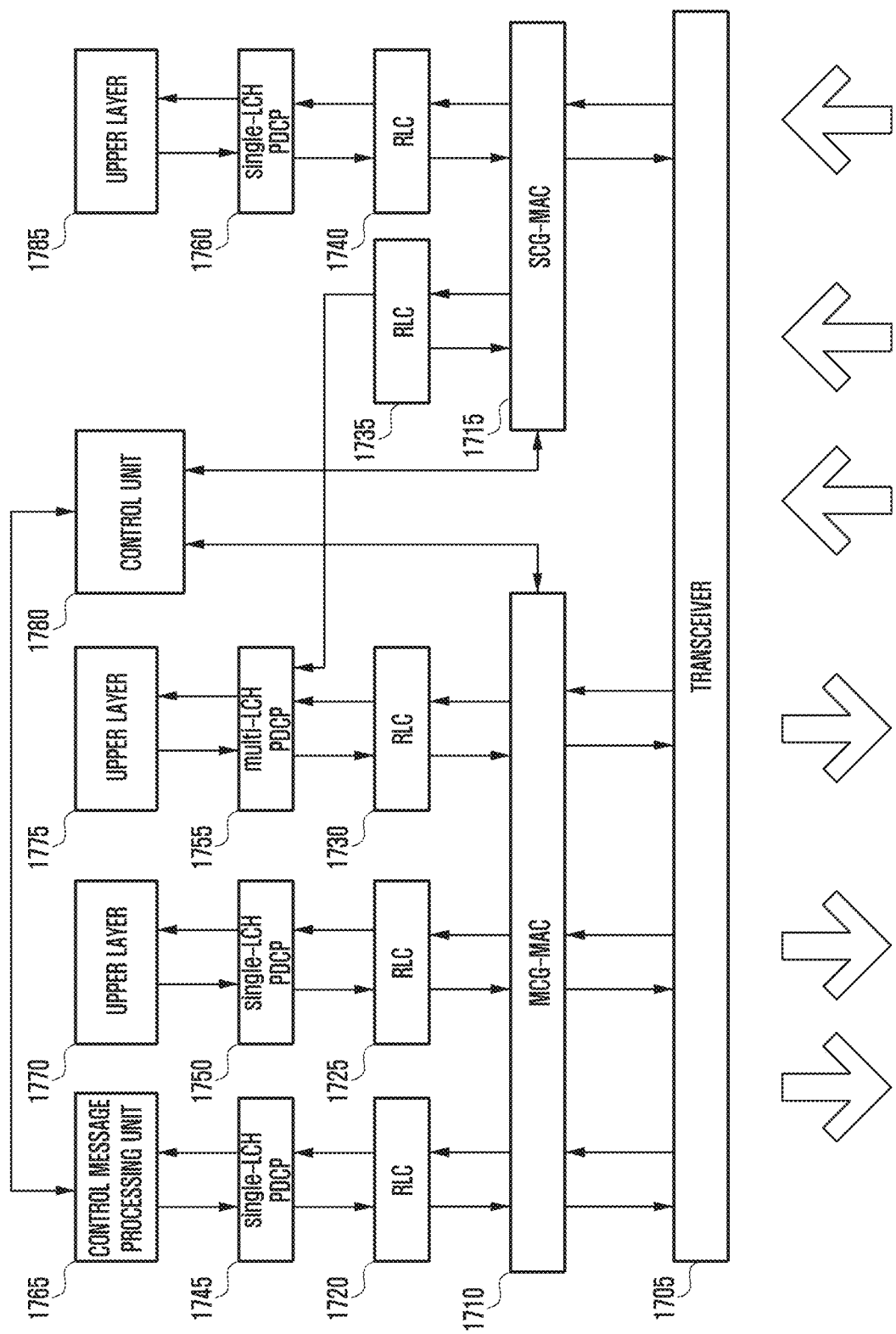
FIG. 17 is a diagram illustrating UE.

FIG. 17 is a block diagram illustrating an example of UE. The UE includes an MCG-MAC device 1710, a control message processing unit 1766, various kinds of upper layer processing units 1770, 1775, and 1785, a control unit 1780, an SCG-MAC device 1715, a transceiver 1705, PDCP devices 1745, 1750, 1755, and 1760, RLC devices 1720, 1725, 1730, 1735, and 1740.

The transceiver receives data and specific control signals through a downlink channel of a serving cell, and transmits data and specific control signals through an uplink channel. If a plurality of serving cells is configured, the transceiver performs data transmission/reception and control signal transmission/reception through the plurality of serving cells.

The MCG-MAC device serves to multiplex data generated in the RLC device or to demultiplex data received from a transmission/reception unit 1605 to transfer the demultiplexed data to appropriate RLC devices. The MCG-MAC device processes BSR or PHR that is triggered with respect to the MCG.

The control message processing unit is an RRC layer device, and processes a control message that is received from an ENB to perform necessary operation. For example, the control message processing unit receives an RRC control message and transfers various kinds of configuration information to the control unit.

The upper layer processing unit may be configured by services. The upper layer processing unit processes data that is generated through a user service, such as File Transfer Protocol (FTP) or Voice over Internet Protocol (VoIP), and transfers the processed data to the PDCP device.

The control unit controls the transmission/reception unit 1605 and the multiplexing/demultiplexing unit to confirm a scheduling command received through the transmission/reception unit, for example, reverse direction grant and to perform reverse direction transmission with appropriate transmission resources at an appropriate time. Further, the control unit performs various kinds of control functions with respect to the UE operation as illustrated in FIG. 15.

The PDCP device is divided into single-LCH PDCPs 1745, 1750, and 1760, and a multi-LCH PDCP 1755. The single-LCH PDCP transmits/receives data only through the MCG or SCG, and is connected to one RLC transmission/reception device. The multi-LCH PDCP receives data through the MCG and the SCG, and transmits data through one of the MCG and the SCG. The multi-LCH PDCP is connected to two RLC receiving devices and one RLC transmitting device.

The multi-LCH PDCP perform sequence rearrangement operation as illustrated in FIGS. 11 to 14.

Figure 18:
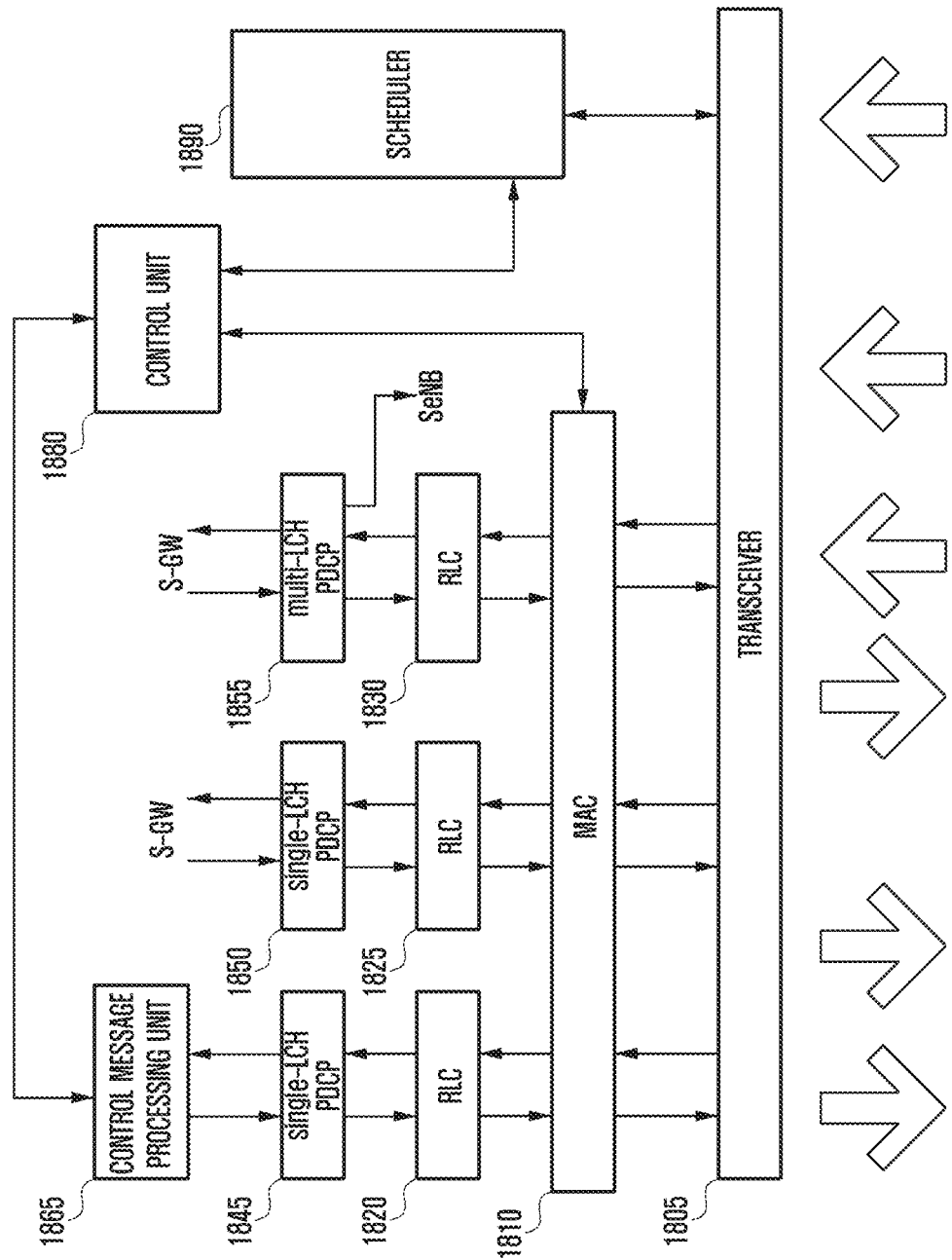
FIG. 18 is a diagram illustrating an ENB.

FIG. 18 is a block diagram illustrating the configuration of an ENB according to an embodiment of the present invention. The ENB includes a MAC device 1810, a control message processing unit 1865, a control unit 1880, a transceiver 1805, PDCP devices 1845, 1850, 1855, and 1860, RLC devices 1820, 1825, 1830, 1835, and 1840, and a scheduler 1890.

The transceiver transmits data and specific control signals with a forward carrier, and receives data and specific control signals with a reverse carrier. If a plurality of carriers is configured, the transceiver performs data transmission/reception and control signal transmission/reception through the plurality of carriers.

The MCG device serves to multiplex data generated in the RLC device or to demultiplex data received from a transmission/reception unit to transfer the demultiplexed data to appropriate RLC devices or the control unit.

The control message processing unit processes a control message that the UE transmits to perform necessary operation, or generates a control message to be transferred to the UE to transfer the generated control message to the lower layer.

The scheduler allocates transmission resources to the UE at an appropriate time, and processes a signal that is transmitted from the UE to the transmission/reception unit or transmits a signal from the transmission/reception unit to the UE.

The PDCP device is divided into single-LCH PDCP and a multi-LCH PDCP. The single-LCH PDCP transmits/receives data only through the MCG or SCG, and is connected to one RLC transmission/reception device. The multi-LCH PDCP receives data through the MCG and the SCG, and transmits data through one of the MCG and the SCG. The multi-LCH PDCP is connected to one RLC receiving device and two RLC transmitting devices.

The multi-LCH PDCP performs sequence rearrangement operation as illustrated in FIGS. 11 to 14.

Those skilled in the art to which the present invention pertains will appreciate that the present invention may be implemented in other detailed forms without departing from the technical spirit or essential characteristics of the present invention. Accordingly, the aforementioned embodiments should be construed as being only illustrative, but should not be construed as being restrictive from all aspects. The scope of the present invention is defined by the following claims rather than the detailed description, and the meanings and scope of the claims and all changes or modified forms derived from their equivalents should be construed as falling within the scope of the present invention.

Meanwhile, preferred embodiments of the present invention disclosed in this specification and drawings and specific terms used therein are illustrated to present only specific examples in order to clarify the technical contents of the present invention and help understanding of the present invention, but are not intended to limit the scope of the present invention. It will be evident to those skilled in the art that various implementations based on the technical spirit of the present invention are possible in addition to the disclosed embodiments.

What is claimed is:

1. A method by a terminal in a wireless communication system, comprising:
   receiving, from a first base station associated with a first cell group, a control message for configuring a second cell group associated with a second base station;
   identifying whether a packet data convergence protocol (PDCP) entity is associated with two radio link control (RLC) entities, wherein a first RLC entity of the two RLC entities corresponds to a first medium access control (MAC) entity associated with the first cell group and a second RLC entity of the two RLC entities corresponds to a second MAC entity associated with the second cell group;
   identifying whether a duplication transmission is activated;
   in case that the duplication transmission is not activated, delivering a PDCP data from the PDCP entity via one of the first RLC entity or the second RLC entity to a corresponding MAC entity, and an RLC control data from the other one of the first RLC entity or the second RLC entity to a corresponding MAC entity, based on information associated with a cell group of one RLC entity of the first RLC entity and the second RLC entity for transmitting an uplink data and a total amount of an amount of the PDCP data and an amount of RLC data; and
   in case that the duplication transmission is activated, delivering the PDCP data from the PDCP entity to both of the first RLC entity and the second RLC entity, wherein the PDCP data is delivered from the first RLC entity to the first MAC entity and from the second RLC entity to the second MAC entity, the PDCP data is transmitted from the first MAC entity to the first base station, and from the second MAC entity to the second base station, and the amount of the PDCP data is indicated to both of the first MAC entity and the second MAC entity.

2. A terminal in a wireless communication system, the terminal comprising:
   a transceiver; and
   at least one processor coupled with the transceiver and configured to:
      control the transceiver to receive, from a first base station associated with a first cell group, a control message for configuring a second cell group associated with a second base station,
      identify whether a packet data convergence protocol (PDCP) entity is associated with two radio link control (RLC) entities, wherein a first RLC entity of the two RLC entities corresponds to a first medium access control (MAC) entity associated with the first cell group and a second RLC entity of the two RLC entities corresponds to a second MAC entity associated with the second cell group,
      identify whether a duplication transmission is activated,
      in case that the duplication transmission is not activated, deliver a PDCP data from the PDCP entity via one of the first RLC entity or the second RLC entity to a corresponding MAC entity, and an RLC control data from the other one of the first RLC entity or the second RLC entity to a corresponding MAC entity, based on information associated with a cell group of one RLC entity of the first RLC entity and the second RLC entity for transmitting an uplink data and a total amount of an amount of the PDCP data and an amount of RLC data, and
      in case that the duplication transmission is activated, deliver the PDCP data from the PDCP entity to both of the first RLC entity and the second RLC entity, wherein the PDCP data is delivered from the first RLC entity to the first MAC entity and from the second RLC entity to the second MAC entity, the PDCP data is transmitted from the first MAC entity to the first base station, and from the second MAC entity to the second base station, and the amount of the PDCP data is indicated to both of the first MAC entity and the second MAC entity.

3. A method by a system including a first base station associated with a first cell group and a second base station associated with a second cell group, comprising:
   transmitting, by the first base station to a terminal, a control message for configuring the second cell group associated with the second base station, wherein the control message includes information associated with a cell group of an RLC entity for transmitting an uplink data, wherein a packet data convergence protocol (PDCP) entity of the terminal is associated with two radio link control (RLC) entities of the terminal, wherein the a first RLC entity of the two RLC entities of the terminal corresponds to a first medium access control (MAC) entity associated with the first cell group and a second RLC entity of the two RLC entities of the terminal corresponds to a second MAC entity associated with the second cell group;
   in case that duplication transmission is not activated, receiving, by the first base station or the second base station, the uplink data transmitted from the terminal, wherein a PDCP data associated with the uplink data is delivered from the PDCP entity via one of the first RLC entity or the second RLC entity to a corresponding MAC entity, and an RLC control data is delivered from the other one of the first RLC entity or the second RLC entity to a corresponding MAC entity, based on information associated with a cell group of one RLC entity of the first RLC entity and the second RLC entity for transmitting an uplink data and a total amount of an amount of the PDCP data and an amount of RLC data; and
   in case that the duplication transmission is activated, receiving, by the first base station and the second base station, the uplink data transmitted from the terminal, wherein the PDCP data is delivered from the PDCP entity to both of the first RLC entity and the second RLC entity, the PDCP data is delivered from the first RLC entity to the first MAC entity and from the second RLC entity to the second MAC entity, the PDCP data is transmitted from the first MAC entity to the first base station, and from the second MAC entity to the second base station, and the amount of the PDCP data is indicated to both of the first MAC entity and the second MAC entity.

* * * * *